United States Patent
Nguyen et al.

(10) Patent No.: US 12,202,732 B2
(45) Date of Patent: *Jan. 21, 2025

(54) AQUEOUS HYDROPHOBIC SILICA DISPERSIONS

(71) Applicant: Cabot Corporation, Boston, MA (US)

(72) Inventors: Lang H. Nguyen, Lowell, MA (US); Kavita K. Pai, Nashua, NH (US); Steven Jacobs, Edgartown, MA (US); Tianqi Liu, Boxborough, MA (US); Melissa J. Monello, Waltham, MA (US); Angelica M. Sanchez Garcia, Somerville, MA (US); Zhangliang Gui, Shanghai (CN); Takashi Umehara, Yokohama (JP)

(73) Assignee: Cabot Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,691

(22) Filed: Apr. 17, 2024

(65) Prior Publication Data

US 2024/0262699 A1    Aug. 8, 2024

Related U.S. Application Data

(63) Continuation of application No. 16/959,278, filed as application No. PCT/CN2019/072987 on Jan. 24, 2019, now Pat. No. 11,987,501.

(60) Provisional application No. 62/621,684, filed on Jan. 25, 2018.

(51) Int. Cl.
*C01B 33/141* (2006.01)
*C09D 7/40* (2018.01)
*C09D 7/61* (2018.01)
*C09D 133/04* (2006.01)
(Continued)

(52) U.S. Cl.
CPC ............ *C01B 33/1417* (2013.01); *C09D 7/61* (2018.01); *C09D 7/70* (2018.01); *C09D 133/04* (2013.01); *C09D 175/04* (2013.01); *D06M 11/79* (2013.01); *C01P 2006/10* (2013.01); *C01P 2006/12* (2013.01); *C01P 2006/82* (2013.01); *D06M 2200/12* (2013.01)

(58) Field of Classification Search
None
See application file for complete search history.

(56) References Cited

U.S. PATENT DOCUMENTS

| | | |
|---|---|---|
| 5,466,742 A | 11/1995 | Wagner et al. |
| 7,811,540 B2 | 10/2010 | Adams |
| 7,951,848 B2 | 5/2011 | Gottschalk-Gaudig et al. |

(Continued)

FOREIGN PATENT DOCUMENTS

| | | |
|---|---|---|
| CN | 1689692 A | 11/2005 |
| CN | 107381581 A | 11/2017 |

(Continued)

OTHER PUBLICATIONS

Griffin, William C., "Calculation of HLB Values of Non-Ionic Surfactants", Journal of the Society of Cosmetic Chemists, pp. 249-256, 1954.

(Continued)

*Primary Examiner* — Ronak C Patel

(57) ABSTRACT

An aqueous hydrophobic silica dispersion includes a hydrophilic particulate silica, a hydrophobic particulate silica having a methanol number of at least 60, and a dispersant having at least one cationic or cationizable group and an HLB ratio of 2 to 20.

3 Claims, 4 Drawing Sheets

Gloss, 20°

(51) Int. Cl.
    *C09D 175/04*     (2006.01)
    *D06M 11/79*     (2006.01)

(56) References Cited

U.S. PATENT DOCUMENTS

| | | |
|---|---|---|
| 8,377,193 B2 | 2/2013 | Lortz et al. |
| 9,114,333 B2 | 8/2015 | Burger et al. |
| 2003/0035888 A1 | 2/2003 | Eriyama et al. |
| 2008/0096984 A1 | 4/2008 | Gottschalk-Gaudig et al. |
| 2014/0316015 A1 | 10/2014 | Burger et al. |
| 2015/0083324 A1 | 3/2015 | Stanjek et al. |
| 2018/0142129 A1 | 5/2018 | Yamamoto et al. |

FOREIGN PATENT DOCUMENTS

| | | |
|---|---|---|
| CN | 107614637 A | 1/2018 |
| EP | 0288419 A1 | 10/1988 |
| EP | 1433749 A1 | 6/2004 |
| JP | 2005/313039 A | 11/2005 |
| JP | 2007/253014 A | 10/2007 |
| JP | 2013/141664 A | 7/2013 |
| JP | 2016/124715 A | 7/2016 |
| WO | WO 02/074869 A1 | 9/2002 |
| WO | WO 2016/106022 A1 | 6/2016 |
| WO | WO 2017/020971 A1 | 2/2017 |
| WO | WO 2017/166173 A1 | 10/2017 |

OTHER PUBLICATIONS

The International Search Report and The Written Opinion of the International Searching Authority, or the Declaration of International Application No. PCT/CN2019/072987, mailed Apr. 19, 2019.

AQUEOUS HYDROPHOBIC SILICA DISPERSIONS

This application is a Continuation of U.S. application Ser. No. 16/959,278, filed on 30 Jun. 2020 which is a § 371 national phase application of and claims priority to International Patent Application No. PCT/CN2019/072987, filed on 24 Jan. 2019, which claims priority from U.S. Provisional Patent Application No. 62/621,684, filed Jan. 25, 2018, the entire contents of which provisional application are incorporated herein by reference.

BACKGROUND OF THE INVENTION

Coatings are used to impart a wide variety of properties on rigid and flexible substrates of many compositions. Corrosion and scratch protection, thermal and electrical insulation, and improved aesthetics are just a few examples in a wide spectrum of coating applications.

As the coating industry develops, goals and requirements are becoming more stringent. It is important, for instance, to reduce emissions of volatile organic compounds (VOCs), with a particular emphasis on indoor and architectural uses. Industrial applications are targeting improvements in corrosion resistance and other protective features for optimized maintenance cycle times.

An important consideration when coating a smooth surface is the degree of gloss imparted. In some instances, shine can be distracting, irritating to the eye or otherwise undesirable. With wood, leather, or other smooth substrates, high gloss can interfere with the desired haptic performance. Conventionally, gloss can be attenuated by covering a clear coating with another coating that can provide a matting effect. This increases costs, labor input, and the overall time dedicated to completing a job. Another approach relies on matting agents, typically in the form of solid particulate additives, that can be combined with a coating formulation to reduce gloss. Known matting agents include inorganic particles such as, for example, particles containing metal oxides. Among these, silica often is considered the agent of choice.

Because particulate silica has low density, special techniques may be needed to handle dry silica to case handling and reduce safety risks. The difficulty of handling dry silica particulates can be reduced by using a liquid dispersion of silica. Such dispersions may be used to produce coatings and in other applications where it is desirable to deliver silica particulates uniformly over a surface. For example, U.S. Patent Publication No. 2017/0101773, published in the name of Doshi on Apr. 13, 2017 and incorporated herein by reference in its entirety, discloses silica aerogel slurries and dispersions that may be applied to batting to enhance its thermal insulative properties. The slurry may be layered between batting layers to form a sandwich or multilayer structure.

U.S. Pat. No. 7,635,411 B2, issued to Field on Dec. 22, 2009, describes using a slurry containing aerogel and fibers to prepare a flexible insulating blanket.

U.S. Pat. No. 6,478,864 B1, issued to Field on Nov. 12, 2002 and incorporated herein by reference in its entirety, discloses a surface coating composition comprising a resin (cellulosics, alkyds, acrylics, epoxies, urethanes, polyesters, and mixtures thereof); hydrophobic metal oxide particles, e.g., silica, silica aerogel, alumina, titania, zirconia, ceria, and magnesia; and a carrier, typically an organic solvent, alcohols, ketones, esters, and ethers, for instance. After application to a substrate, typically wood, the composition is characterized by moisture resistance, organic alcohol resistance, and lower gloss (50 gloss units or less). In many cases, the matting agent utilized is a partially or completely hydrophobic aerogel obtained by modifying the surface of a hydrogel with a silylating agent and drying the surface-modified gel. Specifically referenced in the '864 patent are the silica aerogels prepared according to the teachings of International Publication No. WO 98/23366 (corresponding to U.S. Pat. No. 7,470,725, issued to Schwertfeger, et al. on Dec. 30, 2008). Both documents are incorporated herein by reference in their entirety.

According to U.S. Pat. No. 6,720,368 B2, issued to Field on Apr. 13, 2004 and incorporated herein by reference in its entirety, a matte, thixotropic paint formulation includes a resin system and a matting agent containing a hydrophobic metal oxide having a surface moiety selected from the group consisting of trimethyl silyl, vinyl dimethyl silyl, acryl dimethyl silyl, and dimethyl silyl. The paint formulation has thixotropic properties such that it does not sag at a notch height of about 75 microns (µm) when measured with an anti-sag meter after application to a substrate.

U.S. Pat. No. 7,462,654 B2, issued to Field on Dec. 9, 2008 and incorporated herein by reference in its entirety, describes an anticorrosive surface coating composition comprising a resin system, and a hydrophobic metal oxide aerogel produced via a wet process and having a surface area of at least about 350 m$^2$/g.

Surface treatment of silicas with silylating agents provides a hydrophobic particle that can still provide the desired properties to a coating or dispersion. The dispersion of hydrophobic surface treated silica particles in aqueous media requires dispersants. Such dispersants mediate the interface between the hydrophobic silica and the more polar water molecules in the media. However, such dispersants may interfere with the dispersion of hydrophilic silica components of the coating or dispersion or may be detrimental to the final properties of coatings or other articles prepared with the dispersion.

SUMMARY OF THE INVENTION

Thus, it is desirable to have an aqueous dispersion in which both hydrophobic and hydrophilic silica is dispersed, especially at high loading levels. In addition, it is desirable that such an aqueous dispersion be suitable for use in coatings and other surface treatments that impart properties such as gloss, water resistance, and other desirable properties to substrates.

Common agents such as, for instance, fumed (pyrogenic) silica, precipitated silica or wax can be used to reduce gloss in coatings. The lower the gloss requirements, however, the higher the necessary loading level of conventional matting agents. In turn, these high loading requirements can cause process difficulties and/or performance deficiencies.

As discussed above, U.S. Pat. No. 6,478,864 B1 describes coating compositions that incorporate metal oxides. Among them, hydrophobic metal oxide particles, e.g., a hydrophobic aerogel obtained by surface modification of the aqueous gel, without prior solvent exchange, and subsequent drying, described in the protocols (embodiments) provided by Schwertfeger et al. (International Publication No. WO 98/23366 or its English language equivalent, namely U.S. Pat. No. 7,470,725) are shown to exhibit superior water and alcohol resistance when compared to hydrophilic metal oxide particles. Coatings incorporating this material are described as having a matting effect. However, the reference does not distinguish among the matting properties or performance of various agents disclosed and does not raise any concerns about any possible difficulties in the incorporation of these materials in dispersions or coating compositions.

In preferred embodiments, a hydrophobic particulate silica that may be a hydrophobic aerogel in particulate form, a fumed silica, a precipitated silica, or a colloidal silica may be used. The aqueous silica dispersions and coating dispersions and compositions described herein also contain hydrophilic particulate silica, for example, fumed silica, colloidal silica, and/or precipitated silica. In many embodiments, the particulate silica is provided in a suitable dispersion. The combination of hydrophobic and hydrophilic particulate silica can be used in dispersions for various applications, for example, in various coating systems, in particular water-based and/or clear or pigmented formulations such as acrylics, vinylics, polyurethanes, polyurethane/acrylic hybrids, or others, as known or developed in the art. Dispersions of hydrophobic and hydrophilic silicas may also be used to provide hydrophobicity, water resistance, and, in the case of hydrophobic aerogel, additional thermal insulation to textiles, including fabrics, and blankets and other batting structures or to create a blanket structure.

In one embodiment, an aqueous hydrophobic silica dispersion comprises a mixture of an aqueous base dispersion comprising at least 5 wt %, for example, at least 10%, or at least 15%, of a hydrophilic particulate silica with a hydrophobic particulate silica and a dispersant. The hydrophobic particulate silica has a methanol number of at least 60, preferably at least 70, for example, at least 80 or at least 90. The total amount of particulate silica in the dispersion is at least 15% by weight. The dispersant includes at least one cationic or cationizable group and has an HLB ratio of 2 to 20.

Alternatively or in addition, an aqueous hydrophobic silica dispersion includes at least 5 wt % of a hydrophilic particulate silica selected from the group consisting of fumed silica, colloidal silica, and precipitated silica, hydrophobic silica comprising a particulate silica selected from the group consisting of fumed silica, colloidal silica, silica aerogel, and precipitated silica, the hydrophobic silica having a methanol number of at least 60, and a dispersant having at least one cationic or cationizable group and an HLB ratio of 2 to 20. The total amount of silica in the aqueous hydrophobic silica dispersion is at least 15% by weight.

An aqueous coating composition or dispersion may include any embodiment of the aqueous hydrophobic silica dispersions described herein and a polymer component, and such an aqueous coating composition or dispersion may be used to coat a substrate. A bath for underwater pelletization may include an aqueous hydrophobic silica dispersion. A textile or batting may be treated with a treatment composition including an aqueous hydrophobic silica dispersion.

An aqueous hydrophobic silica dispersions according to any of the embodiments described herein may be combined with a polymer component to form a coating composition. The coating composition may be applied to a surface using a predetermined method and allowed to cure, thereby producing a coated surface. A gloss, measured at 60°, of the coated surface may be at least 15% lower than the gloss (60°) of a control coated surface. The control coated surface is produced with a control coating composition produced without particulate silica but applied in the same manner, i.e., using the same type of apparatus with the same protocol as in the predetermined method.

Alternatively or in addition, a method of preparing a coating composition includes combining an aqueous hydrophobic silica dispersions according to any of the embodiments described herein with a polymer component to form the coating composition.

Alternatively or in addition, a method of preparing an aqueous hydrophobic silica dispersion includes mixing a) a hydrophobic silica comprising a particulate silica selected from the group consisting of fumed silica, colloidal silica, silica aerogel, and precipitated silica, b) a dispersant having at least one cationic or cationizable group and an HLB ratio of 2 to 20 and c) an aqueous base dispersion comprising at least 5% hydrophilic particulate silica selected from the group consisting of fumed silica, colloidal silica, and precipitated silica to form a mixture. The hydrophobic silica has a methanol number of at least 60, and the total silica content of the aqueous hydrophobic silica dispersion is at least 15 wt %.

In any embodiment of the dispersions or methods herein, the aqueous base dispersion may include an acidic and/or basic stabilizing agent, for example, ammonia, ammonium hydroxide, potassium hydroxide, or hydrochloric acid. An aqueous hydrophobic silica dispersion may include less than 10% of a C1-C4 alkyl alcohol and/or may include an additional particulate silica, e.g., fumed silica, colloidal silica, precipitated silica, which additional particulate silica may have a methanol number less than 50. The dispersant may include ethylene oxide and propylene oxide oligomers, and the molar ratio of ethylene oxide mers and propylene oxide mers may be from 0.1 to 11.

The hydrophobic particulate silica may include a hydrophobic silica aerogel in particulate form and having a porosity of at least 90%, a particle density from 120 to 150 $kg/m^3$; and a BET surface area from 700 to 800 $m^2/g$. Alternatively or in addition, the hydrophobic particulate silica may include a hydrophobic treated fumed silica, for example, treated with a siloxane compound, hexamethyldisilazane, or an alkyltrialkoxy- or alkyldialkoxysilane. The weight ratio of hydrophobic silica to hydrophilic silica may be from 5:95 to 95:5. The weight ratio of hydrophobic silica to water in the dispersion may be at least 1:10.

In any embodiment of the coating compositions or dispersions described herein, the total particulate silica content may be from 0.1 to 30% by weight with respect to total solids, and/or the composition may further include at least one additional matting agent. The polymer component may be clear and may include an acrylic formulation, a vinylic formulation, a polyurethane formulation or an acrylic/polyurethane hybrid formulation. When dried, the resulting coating may have a gloss, measured at 60°, that is at least 15% lower than that of a dried control composition or dispersion prepared in the same manner but without particulate silica.

A coating composition or dispersion according to any of the embodiments described herein may be applied to a surface in one or more layers. When preparing the coating composition, the polymer component may be in the form of an aqueous solution or dispersion. Surfaces coated with the coating composition may have a Konig hardness that is at least 94% as high as that of a control coated surface. The control coated surface is prepared with a control coating composition having the same composition but without particulate silica but applied in the same manner, i.e., using the same type of apparatus with the same protocol as for the coating composition according to an embodiment provided herein.

Practicing the invention presents many advantages. For instance, dispersions, treatment compositions and coating compositions described herein can be easily prepared, often relying on commercially available precursors, and can be applied and cured according to standard protocols.

The hydrophobic silica materials utilized can provide improved matting performance relative to widely-used silicas. Moreover, they can be used in combination with other matting agents without significant difficulties in the preparation process. Efficient gloss reductions can be obtained even at low loadings of hydrophobic particulate silica, realizing cost reductions. In turn, low loadings also increase the options, flexibility and freedom to incorporate other performance additives, yet without requiring anti-settling compounds.

The hydrophobic silica can be added to diverse types of coating and treatment compositions, at the point of use or during the manufacture of the coating or treatment system or a component thereof. It exhibits superior dispersion uniformity, high transparency, clarity and formulation flexibility in many media. Long coating lifetime, minimal moisture adsorption, good storage shelf life, and reduced-VOC emissions are other attractive attributes. Aerogel in particular can bring about extreme hydrophobicity, high porosity and excellent light diffusion properties.

When used in conjunction with hydrophilic particulate silica, such as fumed silica, the hydrophobic silica described herein has little or no negative impact on mechanical attributes, yielding, e.g., coatings that have properties such as the Konig hardness, pencil hardness, and others that are at least comparable and sometimes superior to their glossy counterparts. The attenuated gloss achieved can reduce or eliminate shine, glare and mirror effects, casing visual fatigue, and/or realizing a desired esthetic. Often, matte finishes are less prone to becoming unsightly over time, can better hide small scratches or other imperfections and can bring about appealing haptic or visual effects on wood, leather, and other smooth surfaces.

Matte coatings may, in some cases, exhibit high abrasion resistance, corrosion, chemical and/or stain resistance, UV and/or high temperature stability and/or stability in the presence of water or humid conditions. In many cases, especially for water-borne formulations, their application may be conducted without offensive VOC emissions.

While an alternative practice for matting requires the application of a low gloss top coat over a glossy base, a matting agent that can be easily incorporated in the coating system prior to its cure greatly simplifies the coating process, reduces labor costs, eliminates the added waiting period and decreases the opportunities for inadvertent damage associated with drying more than one coat.

Alternatively or in addition, the aqueous hydrophobic silica dispersions according to any embodiment herein may be used to prepare a treatment composition for a textile or batting or employed as a bath for underwater pelletization. Alternatively or in addition, such aqueous hydrophobic silica dispersions may be used to prepare a composition to make a wet-laid blanket.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE FIGURES

In the accompanying drawings, reference characters refer to the same parts throughout the different views. The drawings are not necessarily to scale; emphasis has instead been placed upon illustrating the principles of the invention. Of the drawings.

B 1.9% Aqueous hydrophobic silica dispersion P in resin formulation
C 3.7% Aqueous hydrophobic silica dispersion P in resin formulation
D 7.4% Aqueous hydrophobic silica dispersion P in resin formulation
E 1.8% Aqueous hydrophobic silica dispersion Q in resin formulation
F 3.7% Aqueous hydrophobic silica dispersion Q in resin formulation
G 7.4% Aqueous hydrophobic silica dispersion Q in resin formulation
H 5% Comparative R in resin formulation
I 10% Comparative R in resin formulation
J 20% Comparative R in resin formulation
K 5% Comparative S in resin formulation
L 10% Comparative S in resin formulation
M 20% Comparative S in resin formulation.

Figure 1:
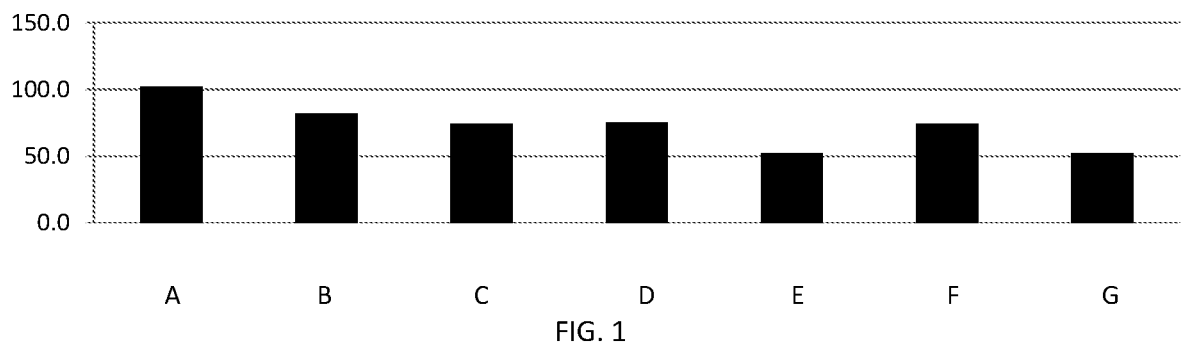
FIGS. 1 and 2 are gloss bar graphs at 20° and 60°, respectively, of a control polyurethane-based coating (A), and polyurethane-based coatings prepared using a CAB-O-SPERSE® PG 022 base dispersion in combination with one of aerogel (1.5 wt % aerogel, B and 3.0 wt % aerogel, C); aerogel and precipitated silica (1.5 wt % aerogel, D and 3.0 wt % aerogel, E); and aerogel and wax (1.5 wt % aerogel, F, and 3.0 wt % aerogel, G).
Figure 2:
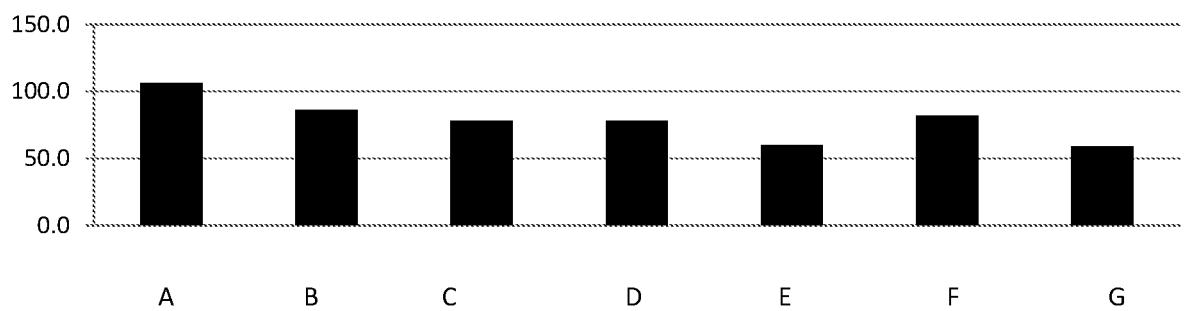
Figure 3:
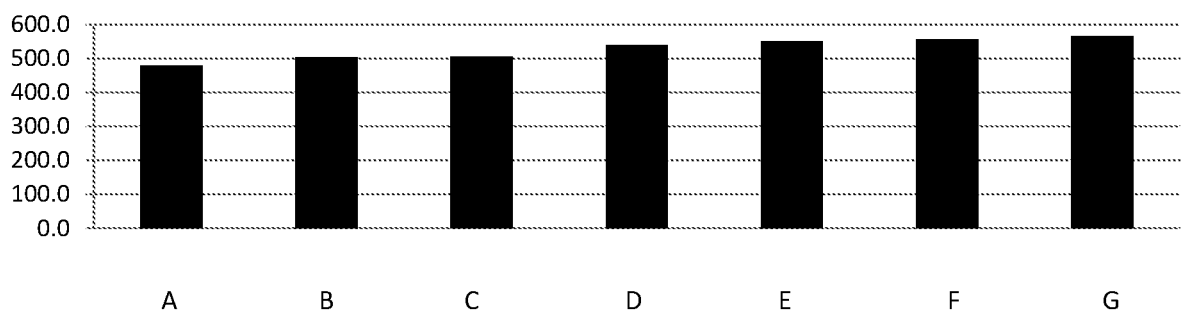
FIG. 3 is a haze bar graph of a control polyurethane-based coating (A) and polyurethane-based coatings prepared using a CAB-O-SPERSE® PG 022 base dispersion in combination with one of aerogel (1.5 wt % aerogel, B and 3.0 wt % aerogel, C); aerogel and precipitated silica (1.5 wt % aerogel, D and 3.0 wt % aerogel, E); and aerogel and wax (1.5 wt % aerogel, F. and 3.0 wt % aerogel, G).
Figure 4:
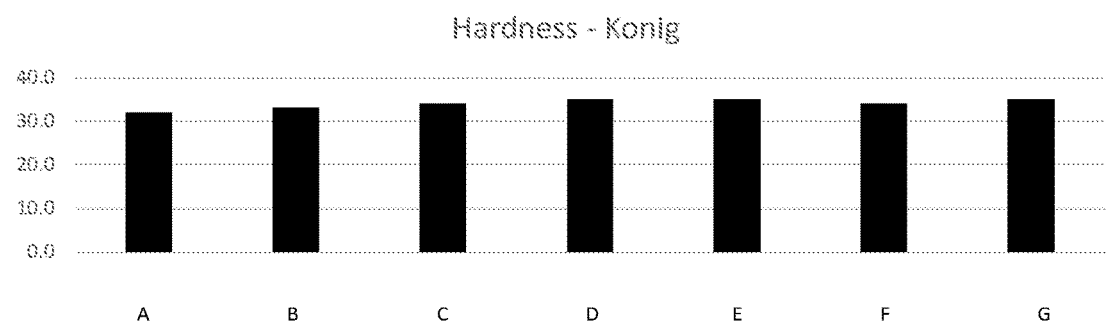
FIG. 4 is a bar chart of Konig hardness data measured for a control polyurethane-based coating (A) and polyurethane-based coatings prepared using a CAB-O-SPERSE® PG 022 starting dispersion in combination with one of aerogel (1.5 wt % aerogel, B and 3.0 wt % aerogel, C); aerogel and precipitated silica (1.5 wt % aerogel, D and 3.0 wt % aerogel, E); and aerogel and wax (1.5 wt % aerogel, F, and 3.0 wt % aerogel, G).
Figure 5:
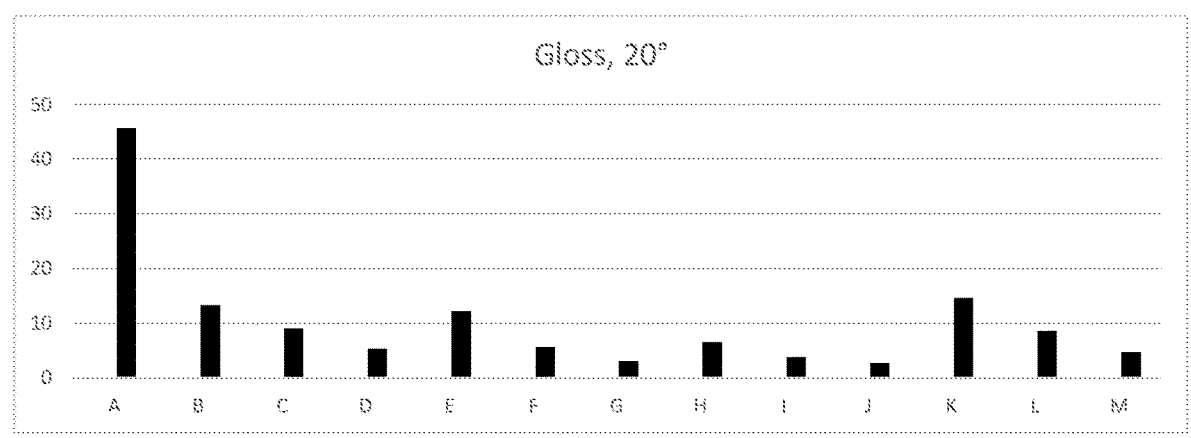
FIGS. 5 and 6 are gloss bar graphs at 20° and 60°, respectively, for a control coating (A), coatings prepared according to exemplary embodiments of the invention (B-G) and comparative coatings (H-M) prepared using conventional matting agents, as follows.
Figure 6:
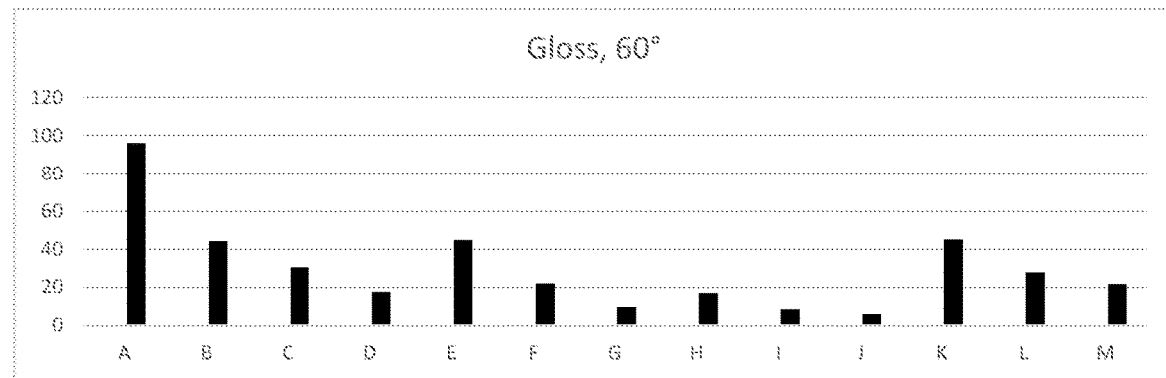
Figure 7:
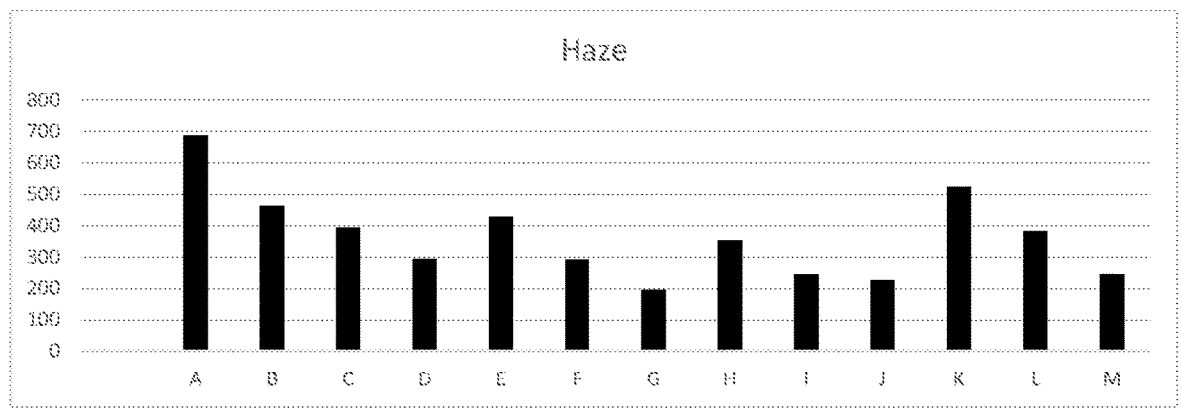

FIG. 7 is a haze bar chart of a control polyurethane coating, coatings prepared according to exemplary embodiments of the invention, and comparative coatings prepared using conventional matting agents as described with respect to FIGS. 5 and 6.

Figure 8:
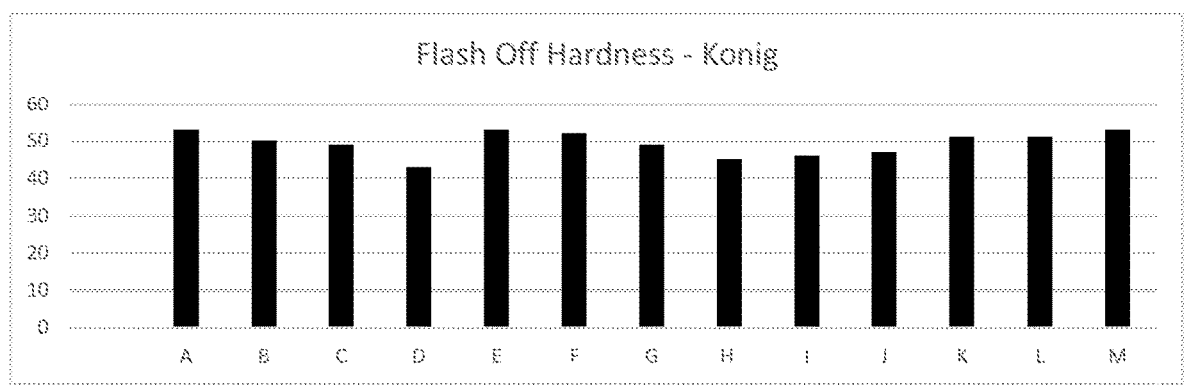
Figure 9:
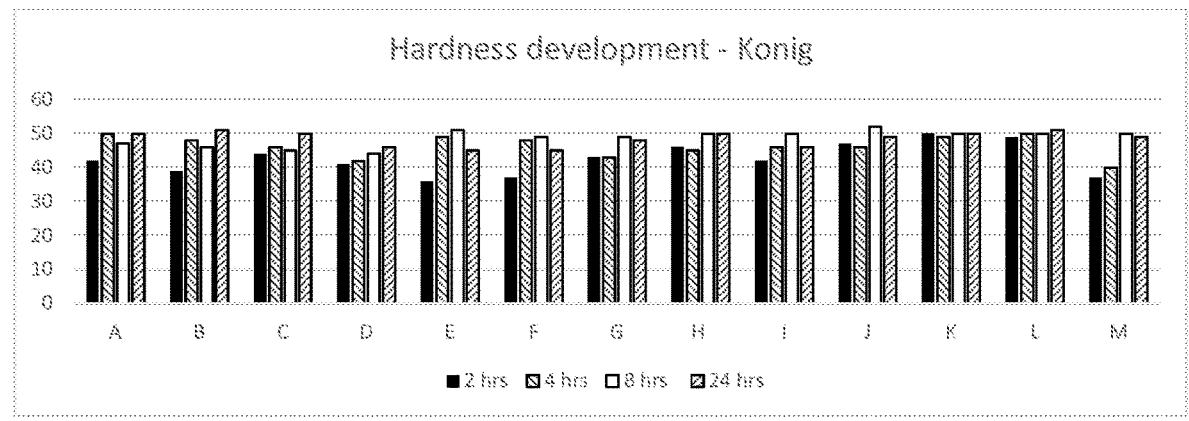

FIGS. 8 and 9 are bar charts of flash-off Konig hardness and Konig hardness development, respectively for a control coating, coatings prepared according to exemplary embodiments of the invention and comparative coatings prepared using conventional matting agents as described with respect to FIGS. 5 and 6.

Figure 10:
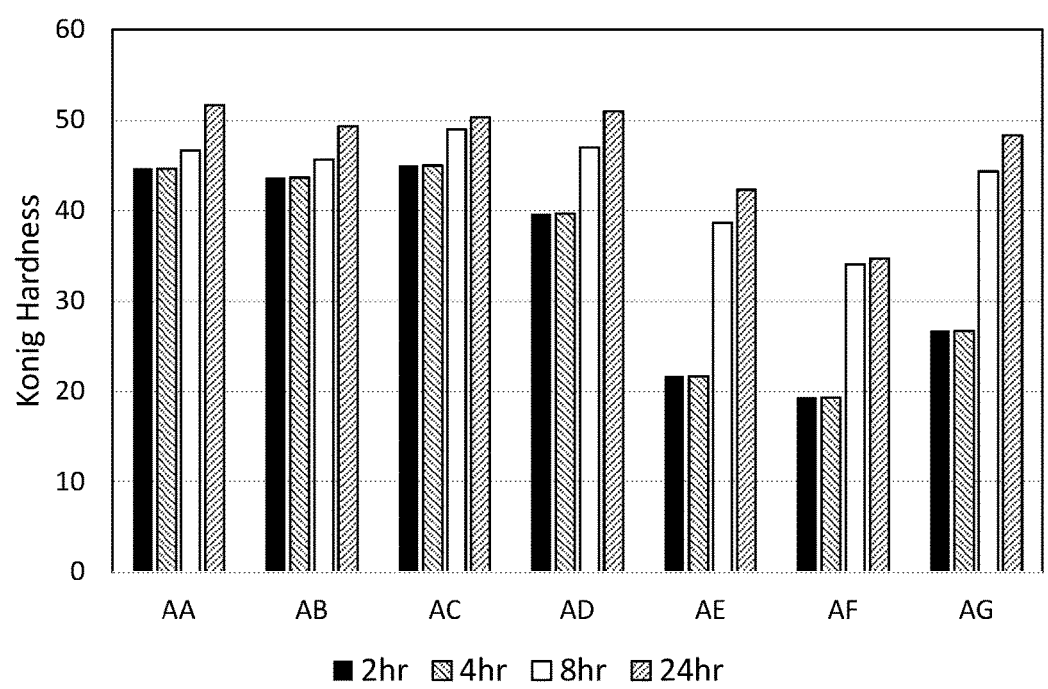

FIG. 10 is a series of bar charts of Konig hardness development with time of a control acrylic coating (AA), acrylic-based coatings prepared according to an exemplary embodiment of the invention (AB, AC, AD), and comparative acrylic-based coatings prepared with a conventional matting agent (AE, AF, AG) (AB and AE: 1.84 wt % solid matting agent with respect to resin; AC and AF: 3.69 wt %; AD and AG: 7.38 wt %).

DETAILED DESCRIPTION OF THE INVENTION

In one embodiment, an aqueous hydrophobic silica dispersion comprises at least 5 wt %, for example, at least 10%, or at least 15%, of a first hydrophilic particulate silica and hydrophobic particulate silica. The hydrophobic particulate silica has a methanol number of at least 60, preferably at least 70, for example, at least 80 or at least 90. The total amount of particulate silica in the dispersion is at least 15% by weight. The dispersion includes a dispersant having at least one cationic or cationizable group and an HLB ratio of 2 to 20.

The solvent of the aqueous hydrophobic silica dispersion comprises at least 70% water, for example, at least 80% water, at least 90% water, at least 95% water, or at least 99% water. The use of additional solvents, especially shorter alkyl alcohols, may lead to the evaporation of undesirable organic species when the dispersion or formulations prepared with it are dried or cured in depositing a coating on a substrate. Nonetheless, higher boiling point solvents may aid in the dispersion of resins and other components of formulations with which the aqueous hydrophobic silica dispersion is used. The aqueous hydrophobic silica dispersion may further include a defoamer.

Silica, an inorganic material having silicon dioxide ($SiO_2$) as a basic structural unit, exists in a variety of molecular forms, which include, for example, monomers, dimers, oligomers, cyclic forms, and polymers. In addition, silica can be amorphous, crystalline, hydrated, solvated, or dry, and can exist in a variety of particulate and aggregated states.

Of special interest here is "pyrogenic" or "fumed" silica, a material that typically has a particle size from 2-20 nm and is formed from the vapor phase. Such silica may be used as the hydrophilic, or, with appropriate surface treatment, as the hydrophobic silica in the aqueous hydrophobic silica dispersions and other compositions herein. In one manufacturing process, silica (usually sand) is vaporized at about 2000° C. and cooled to form anhydrous amorphous silica particles. Alternatively, silica can be sublimed at about 1500° C. in the presence of a reducing agent (e.g., coke) to form SiO, which can be oxidized to form particulate silica. Other methods of producing fumed silica include, for example, oxidation of $SiCl_4$ at high temperatures or burning $SiCl_4$ in the presence of methane or hydrogen.

A well-documented process for producing fumed metal oxides involves the hydrolysis of suitable feed stock vapor (such as aluminum chloride for a fumed alumina, or silicon tetrachloride for a fumed silica) in a flame of hydrogen and oxygen. Molten particles of roughly spherical shape are formed in the combustion process, and the particle diameters may be varied through control of process parameters. These molten spheres, referred to as primary particles, fuse with one another by undergoing collisions at their contact points to form branched, three-dimensional chain-like aggregates. The formation of the aggregates is considered to be irreversible as a result of the fusion between the primary particles. During cooling and collecting, the aggregates undergo further collisions that may result in some mechanical entanglements to form agglomerates. These agglomerates are thought to be loosely held together by van der Waals forces and can be reversed, i.e. de-agglomerated, by proper dispersion in a suitable media.

Alternative methods for producing pyrogenic silica particles have been developed, as described, for example, in U.S. Pat. Nos. 4,755,368, 6,551,567, and 6,702,994, US Patent Publication No. 20110244387, in Mueller, et al., "Nanoparticle synthesis at high production rates by flame spray pyrolysis," *Chemical Engineering Science*, 58: 1969 (2003), in Naito, et al., "New Submicron Silica Produced by the Fumed Process," published in NIP 28: International Conference on Digital Printing Technologies and Digital Fabrication 2012, 2012, p. 179-182, and in Kodas and Hampden-Smith, *Aerosol Processing of Materials*, Wiley-VCH, 1998, the contents of all of which are incorporated by reference. Other methods for preparing pyrogenic silica particles are known.

In some embodiments, pyrogenic silicas for use in the dispersions and coatings described herein have a BET surface area from 50 to 550 $m^2/g$, such as, for instance, from 75 to 150, 150 to 250, 250 to 350, or 350 to 400 $m^2/g$. Mass average aggregate size can be from 130 nanometers (nm) to 240 nm, e.g., 150 to 210 nm, as measured by photocorrelation spectroscopy.

Non-limiting examples of fumed silicas include CAB-O-SIL® fumed silica available from Cabot Corporation, HDK® fumed silica products available from Wacker Chemie AG, and AEROSIL® fumed silica available from Evonik Industries, Essen, Germany.

Particulate silicas other than fumed silica also can be employed as the hydrophilic, or, with appropriate surface treatment, as the hydrophobic silica in the aqueous hydrophobic silica dispersions herein and other compositions herein. In one example, the hydrophilic particulate silica is a colloidal silica. As known in the art, colloidal metal oxide particles such as silica particles are typically non-aggregated, individually discrete (primary) particles, which typically are spherical or nearly spherical in shape, but can have other shapes (e.g., shapes with generally elliptical, square, or rectangular cross-sections). Aggregated colloidal silicas may also be employed in the dispersions and coatings provided herein. Colloidal silicas are commercially available or can be prepared by known methods from various starting materials (e.g., wet-process type silicas). Colloidal silica particles are typically fabricated in a manner similar to precipitated metal oxide particles (i.e., they are coagulated from an aqueous medium) but remain dispersed in a liquid medium (often water alone or with a co-solvent and/or stabilizing agent). Metal oxide particles can be prepared, for example, from silicic acid derived from an alkali silicate solution having a pH of about 9 to about 11, wherein the silicate anions undergo polymerization to produce discrete silica particles having the desired average particle size in the form of an aqueous dispersion. Typically, the colloidal silica starting material will be available as a sol, which is a dispersion of colloidal silica in a suitable solvent, most often water alone or with a co-solvent and/or stabilizing agent. See, e.g., Stoeber, et al., "Controlled Growth of Monodisperse Silica Spheres in the Micron Size Range," Journal of Colloid and Interface Science, 26, 1968, pp. 62-69, Akitoshi Yoshida, Silica Nucleation, Polymerization, and Growth Preparation of Monodispersed Sols, in Colloidal Silica Fundamentals and Applications, pp 47-56 (H. E. Bergna & W. O. Roberts, eds., CRC Press: Boca Raton, Fla., 2006), and Iler, R. K., The Chemistry of Silica, p 866 (John Wiley & Sons: New York, 1979). Non-limiting examples of commercially available colloidal silicas suitable for use in the invention include SNOWTEX® products from Nissan Chemical, LUDOX® products available from W.R. Grace & Co., NexSil™ and NexSil™ A series products available from Nyacol Nanotechnologies, Inc., Quartron™ products available from Fuso Chemical, and Levasil® products available from AkzoNobel. Typical primary particle sizes of colloidal silicas suitable for use with the aqueous dispersions provided herein are from 5 nm to 300 nm, for example, 10 nm to 100 nm, 20 nm to 80 nm, 30 nm to 250 nm, 60 nm to 200 nm, 150 nm or less, 130 nm or less, or 100 nm or less.

Precipitated silica also can be used as the hydrophilic, or, with appropriate surface treatment, as the hydrophobic silica in the aqueous hydrophobic silica dispersions and other compositions herein. Precipitated silica particles may be manufactured utilizing conventional techniques and are often formed by the coagulation of the desired particles from an aqueous medium under the influence of high salt concentrations, acids, or other coagulants. The silica particles are filtered, washed, dried, and separated from residues of other reaction products by conventional techniques known to those skilled in the art. Precipitated particles are often aggregated in the sense that numerous primary particles coagulate to one another to form a somewhat spherical aggregated cluster. Those of ordinary skill in the art will readily recognize that such aggregated clusters are structurally different from fumed or pyrogenically prepared particles, which are chain-like structures of aggregated primary particles in which the primary particles are fused to one another. Non-limiting examples of commercially available precipitated silicas include Hi-Sil® products from PPG Industries, Inc., Perkasil® products from WR Grace & Co., Zeosil® products from Solvay S.A., Hubersil® products from JM Huber Corp., and SIPERNAT® products available from Evonik Industries. Precipitated silicas for use in the aqueous dispersions herein may have a surface area (BET) of 20 $m^2/g$ to 450 $m^2/g$, for example, 30 $m^2/g$ to 400 $m^2/g$. 60 $m^2/g$ to 250 $m^2/g$, or 80 $m^2/g$ to 200 $m^2/g$.

The hydrophilic silica component or portion thereof can be provided in a dispersion, generally referred to herein as a "starting" or "base" dispersion, formulation or composition. As used herein, a "dispersion" refers to a system in which particles are dispersed in a continuous phase of a different composition (or state) with little or no settling. In many cases, the dispersion used herein is aqueous and in specific examples it contains water in an amount of at least 50% by weight, for instance, from 50 to 95 weight %, such as from 55 to 80, 85 or 90 weight %.

The amount of hydrophilic silica in the aqueous hydrophobic silica dispersion can vary. In many embodiments, silica is present in the dispersion in an amount of at least 5 wt %, at least 10 wt %, at least 15 wt %, or at least 20 wt %, for example, 5 to 40% by weight, 10% to 30%, 15% to 25% or less, 5% to 20%, 10% to 17%, 5% to 12%, or 5% to 10% by weight. Specific examples utilize hydrophilic silica loading from 10 to 35 weight %, e.g., from 12 to 30 weight %; from 10 to 25 weight %; or from 15 to 20 weight %. Other loading levels can be selected.

In addition to hydrophilic particulate silica and water, the starting dispersion may include a defoamer. The dispersion can be free of added dispersants and surfactants and can be electrostatically stabilized for example, with an acid such as hydrochloric acid or others or a base such as ammonia or potassium or ammonium hydroxide or others. Combinations of acids and bases may be used as well.

Hydrophilic particulate silica dispersions can be acidic or basic, with illustrative pH values from 3.5 to 10.5 or 11. In some implementations, the starting dispersion selected has a pH less than 7, e.g., 6 or less, for instance 4 or less, such as, for instance from 3 to 9 or from 5 to 8. In other implementations, the starting dispersion has a pH from 7 to 11, e.g., from 8 to 10.5. The silica-containing dispersion can be optimized with respect to the nature of the hydrophilic silica employed, loading, pH, viscosity, end uses and/or other parameters, and may include fumed silica, colloidal silica, or precipitated silica. In further embodiments, the starting dispersion contains two or more types of silica. Ready to use, commercially available dispersions containing fumed silica include CAB-O-SPERSE® products available from Cabot Corporation and AERODISP® products available from Evonik Industries. Silica may also be dispersed in water with a suitable mixer or mill, such as a rotor-stator mill.

In one embodiment, an aqueous hydrophobic silica dispersion is produced by mixing a dispersion of hydrophilic particulate silica, e.g., a base dispersion as described above, with hydrophobic particulate silica. The entire hydrophobic silica amount can be incorporated in the base dispersion at once or, in some embodiments, in two or more increments.

In one embodiment, to provide hydrophobic particulate silica, untreated fumed, precipitated, or colloidal silica particles (which typically are hydrophilic) can be treated with an agent that associates with or covalently attaches to the silica surface, e.g., to add some hydrophobic characteristics. Silica treating agents can be any suitable silica treating agent and can be covalently bonded to the surface of the silica particles or can be present as a non-covalently bonded coating. Typically, the silica treating agent is bonded either covalently or non-covalently to silica.

In many cases, the silica treating agent can be a silicone fluid, for example a non-functionalized silicone fluid or a functionalized silicone fluid, a cyclic siloxane, hydrophobizing silanes, functionalized silanes, silazanes or other silica treating agents, e.g., as known in the art.

In certain embodiments, the silica-treating agent comprises a hydrophobizing silane. For example, the silica-treating agent can be a compound of the formula: $R_{4-n}SiX_n$ wherein n is 1-3, each R is independently selected from the group consisting of hydrogen, a C1-C18 alkyl group, a C3-C18 haloalkyl group, and a C6-C14 aromatic group, and each X is independently a C1-C18 alkoxy group or halo. In certain embodiments, the silica-treating agent comprises a functionalized silane. The functionalized silane can comprise at least one functional group selected from the group consisting of acrylate, methacrylate, amino, anhydride, epoxy, halogen, hydroxyl, sulfur, vinyl, isocyanate, and combinations thereof. In certain embodiments, the silica-treating agent comprises a silazane, for example, the silica-treating agent can be hexamethyldisilazane, octamethyltrisilazane, a cyclic silazane, and the like. Treatment of fumed silicas also can effect a reversal of the charge on the particles, e.g., from negative to positive. Preferred hydrophobic treating agents for silicas for use as the hydrophobic silica in various embodiments herein include hexamethyldisilazane, alkyltrialkoxysilanes and alkyldialkoxysilanes such as octamethyltrimethoxysilane, hexamethyldisiloxane, and siloxane compounds including but not limited to cyclic siloxanes, silicone fluids, and siloxane polymers including polydimethylsiloxane and functionalized siloxane polymers such as mono- and di-functional hydroxyl-terminated PDMS and dimethylsiloxane co-polymers including methylhydrosiloxane and/or methylhydroxylsiloxane mers.

Hydrophobic silicas are commercially available under the CAB-O-SIL name from Cabot Corporation, the HDK name from Wacker Chemie AG, and the Aerosil name from Evonik Industries. Exemplary hydrophobic fumed silicas include CAB-O-SIL TS-720, TS-382, and TS-530 silicas from Cabot. Commercial hydrophobic precipitated silicas are available under the Agilon name from PPG Industries, Inc. and the Coupsil name from Evonik Industries. Hydrophobic colloidal silicas may be produced as described in U.S. Pat. Nos. 7,811,540, 8,202,502, 8,435,474, 8,455,165, and 8,895,145, and US Publication No. 2008/0070146, the contents of all of which are incorporated herein by reference.

Alternatively or in addition, the hydrophobic particulate silica is a hydrophobic aerogel. As used herein, the term "aerogel" refers to a gel with air as dispersion medium. Suitable aerogels that can be used are described, for instance, in U.S. Pat. No. 7,470,725, the entire contents of which are incorporated herein by this reference. As taught in this patent, the aerogel can be prepared by modifying the surface of a hydrogel and drying the modified gel.

In many implementations disclosed herein the aerogel is fully (completely or entirely) hydrophobic. Such an aerogel presents a very high degree of coverage of the internal surface, which is close to the theoretically possible degree of coverage. As used herein, the degree of coverage is the number of organic surface groups per square nanometer of internal surface area of the aerogels. Determining the degree of coverage can be conducted as described in the '725 patent.

Typically, the aerogel employed has a high porosity, e.g., at least 90%, for example from 90% to 95%, e.g., from 91% to 95%; from 92% to 95%; from 93% to 95%; or from 94% to 95%. Aerogel having a porosity higher than 95% also can be utilized.

Preferably, the hydrophobic aerogel is provided as a particulate material (granulate). Exemplary aerogels that can be utilized have the properties shown in Table 1 below:

TABLE 1

| Particle Size | Microns to millimeters |
| Surface Chemistry | Hydrophobic |
| Porosity | 90-95% |
| Surface Area | 700-800 m$^2$/g |
| Particle Density | 120-150 kg/m$^3$ |
| Optical | Translucent or Opaque |
| Thermal Conductivity | 12 mW/m · K |
| Contact angle | 150° |
| Oil Absorption | 540-650 g DBP/100 g particle |
| Operating Temperature$^a$ | −196° C. to 300° C. |

$^a$To maintain hydrophobicity

As known, opaque materials are neither transparent nor translucent. Rather, all the visible light waves directed at an opaque surface are absorbed and/or reflected, with none being transmitted. In contrast, transparent and translucent materials let visible light waves pass through. In the case of translucency, however, the light is diffused and, generally, objects on the other side of a translucent material are not clearly visible.

Many aerogels are commercially available. In specific implementations suitable aerogels in particulate form are available from Cabot Corporation under designations such as Enova® aerogel. Specific examples include ENOVA® MT 1100 aerogel, ENOVA® MT 1200 aerogel, ENOVA IC3130 aerogel, ENOVA IC3110 aerogel, ENOVA IC3120 aerogel, ENOVA IC3100 aerogel, and ENOVA LA1000 aerogel.

The aqueous hydrophobic silica dispersion includes both a hydrophilic particulate silica and a hydrophobic particulate silica having a methanol number of at least 60, preferably at least 70, for example, at least 80 or at least 90. Without being bound by any particular theory, it is believed that residual hydrophobic groups on the otherwise hydrophilic silica facilitate dispersion of the hydrophobic particulate silica. The aqueous hydrophobic silica dispersion may further comprise an additional particulate silica having a methanol number of 50 or less, for example, at most 40 or at most 30. Such silica may be partially hydrophobized as described above.

Preferably, the aqueous hydrophobic silica dispersion contains less than 10 wt % of a C1-C4 alkyl alcohol, for example, less than 5%, less than 1%, less than 0.1 wt % alcohol, or less than 0.01 wt % alcohol. The use of alcohol, e.g., methanol, ethanol, and various isomers of alcohols such as butanol and propanol results in the evaporation of undesirable volatile species when the aqueous hydrophobic silica dispersion is optionally combined with other components and used in end-use applications in which the solvent is evaporated or dried.

Independently of the presence of additional particulate silica or alcohol, the aqueous hydrophobic silica dispersion includes a dispersant. The hydrophilic particulate silica need not fully disperse the hydrophobic silica. Preferably, the dispersant includes a cationic or cationizable group that can interact with any residual silanol groups on the hydrophobic silica and also includes both hydrophilic groups that can interact with the aqueous media and groups that, in addition to the cationic or cationizable group, can also interact with the surface of the hydrophobic silica. The cationic or cationizable group may be a primary or secondary amine or phosphine. Preferably, the dispersant has an HLB of 2 to 20, for example, from 2 to 5, from 5 to 10, from 10 to 15 or from 15 to 20. More preferably, the dispersant has ethylene oxide (EO) and propylene oxide (PO) oligomeric groups, most preferably in an EO/PO ratio from 0.1 to 11, for example, from 0.2 to 7, from 0.5 to 9, from 1 to 8, from 2 to 10.5, or from 3 to 6. The propylene oxide groups may facilitate dispersion by interaction with the hydrophobic silica surface but remain soluble in the aqueous solvent, further stabilizing the dispersion with respect to additional dispersants. The dispersant may have a weight average molecular weight from 400 to 4000, for example, from 500 to 1200, from 800 to 1500, from 1300 to 2000, from 1500 to 2200, from 1800 to 3000, or from 2500 to 3500. It was discovered that the cationic dispersants successfully disperse the hydrophobic silica without causing the hydrophilic silica dispersion to gel and without leading to haziness in coatings produced using the aqueous hydrophobic silica dispersion. Without being bound by any particular theory, it is believed that haziness is caused by separation of the hydrophilic and hydrophobic silicas in the dispersion. Furthermore, the dispersants of exemplary and preferred embodiments herein are believed to contribute to water resistance in coatings produced using the aqueous hydrophobic silica dispersion.

Furthermore, it was discovered that, when combined with a base dispersion containing a hydrophilic silica such as a fumed silica, hydrophobic particulate silica, particularly hydrophobic fumed silica or aerogel, can bring about light diffusion properties that yield desired matting effects and clarity and rheological attributes that allow its successful incorporation, resulting in stable silica dispersions and coatings that can be highly transparent. Furthermore, limiting the quantities of alcohol in the aqueous hydrophobic silica dispersion reduces the amount of volatile species released to the environment while the coating composition or dispersion is cured. This makes coating compositions and dispersions employing the aqueous hydrophobic silica dispersions provided herein more suitable for use indoors or over large surface areas.

Other ingredients such as described above also can be introduced into the base dispersion, before during or after the addition of the hydrophobic silica granulate. Examples include but are not limited to solvents, additives, stabilizers, opacifiers, pigments, and so forth. Anti-settling agents may be added but, in many cases, are not required. In some situations, one or more additional ingredients, e.g., opacifiers, is/are present within, e.g., aerogel particles.

Typically, the hydrophobic silica component and/or other ingredients used is added to the starting dispersion by a mixing process, using a suitable mixing means, high speed mixers such as those available from BYK-Chemie and Eiger, for example. Low, moderate or high agitation can be employed. Depending on the particle size desired for the end-use application, it may be appropriate to mill the aqueous hydrophobic silica dispersion. Suitable mixing devices, rates, duration, and/or other conditions can be determined by routine experimentation.

For coating applications, the hydrophobic silica can be used alone or in combination with at least one other solid material, typically a material known in matting applications, such as, for instance, wax or additional particulate silica having a methanol number less than 50, for example less than 30, e.g., precipitated silica, colloidal or fumed silica. Such silicas may also be surface treated and yet be less hydrophobic than the hydrophobic silica of the aqueous hydrophobic silica dispersion.

Methanol number may be measured using Rhesca Wet-101P powder wettability tester (Rhesca Co. Ltd.) according to the manufacturer's instructions using a starting solution of 60 mL, a stir rate of 300 rpm, a methanol flow rate of 2 mL/min. The starting solution is degassed by stirring for at least 5 min at 1000 rpm prior to adding the sample. The measurement is typically run with 0.1 g of sample in a starting solution of 30% methanol. However, a more or less hydrophobic starting solution may be employed depending on the hydrophobicity of the sample. The test is run by titrating the starting solution with methanol; the methanol number is the amount of methanol in the solution when the sample, which is initially sitting on top of the starting solution, starts to wet into, or sink, into the solution. Alternatively, a threshold methanol number of a powder may be determined by carefully pouring a sample onto the surface of a methanol-water solution having a known methanol concentration. If the sample does not wet into the solution, its methanol number is higher than the concentration of methanol in the solution.

In the aqueous hydrophobic silica dispersion obtained by combining the hydrophobic silica component with the starting (hydrophilic silica-containing) dispersion, hydrophobic silica can be present in an amount from 1 to 20 weight percent relative to the total weight of the aqueous hydrophobic silica dispersion, e.g., in an amount from 1 to 5; from 5 to 20; from 10 to 20; from 15 to 20; from 5 to 10; from 5 to 15; or from 15 to 20 weight %. Weight ratios of hydrophobic silica to hydrophilic silica (including additional silica having a methanol number less than 50) present in the base dispersion can be from 5:95 to 95:5, for example, from 10:90 to 90:10, from 15:85 to 85:15, from 20:80 to 80:20, from 30:70 to 70:30, from 35:65 to 65:35, from 40:60 to 60:40, or from 45:55 to 55:45. The total amount of particulate silica in the aqueous hydrophobic silica dispersion is at least 15%, for example, at least 16%, at least 17%, at least 18%, at least 19%, at least 20%, at least 22%, or at least 25% by weight, for example, from 15% to 35%, from 18% to 30%, or from 18% to 28% by weight. The hydrophobic silica may be present in the aqueous hydrophobic silica dispersion in a mass ratio of at least 1:10 with respect to water, for example, at least 1:9, at least 1:8, at least 1:7, or at least 1:6, for example from 1:10 to 2:9 or from 1:10 to 1:5 or 1:6.

Gloss is a function of light reflection: the more light that is reflected and directed, the more glossy the surface appears. Addition of a matting agent, such as micron sized pyrogenic silica, creates microroughness on the surface resulting in light scattering at any angle and therefore a decrease in gloss. One of the disadvantages of incorporating such large particles in a coating composition is that over time, they show hard settling in the coating. It was discovered that, with the addition of hydrophobic silica particles, such settling issues can be eliminated. However, due to high porosity, hydrophobicity and air entrapment, the hydrophobic silica particles may tend to float to the top of the dispersion and create a hazy or translucent (rather than clear) phase separation appearance. It was further discovered that by keeping the total percent particulate silica (hydrophobic and hydrophilic) of the dispersion at 15 wt % or greater, for example, 20 wt %, 25 wt %, 30 wt % or greater relative to the total weight of the aqueous hydrophobic silica dispersion, the phase separation behavior can be reduced or eliminated. Without being bound by any particular theory, when the solids are above this threshold, the particles form network structures strong enough to prevent hydrophobic particles from flocculating or gelling, yet weak enough to be pumped into any coating formulations.

The aqueous hydrophobic silica dispersion can have a pH from 7 to 9.5, such as, for instance, from 7.5 to 9.

Aqueous hydrophobic silica dispersions can be stable for hours, days or weeks. In one example, the aqueous hydrophobic silica dispersion is stable for at least 2, 3, 4, 5, 6, 7 or 8 weeks at 50° C., for example, from 2 to 8 weeks or from 4 to 8 weeks or more. The stable dispersion is preferably in a fluid state but may also form silica networks that increase the viscosity of the dispersion at rest but are easily disrupted with agitation or stirring to return the dispersion to a flowable or pumpable fluid. Stability may be enhanced by the addition of a suitable amount of a solvent, preferably one commonly used in the desired end-use formulation; for example, coatings formulations commonly employ dimethylethanolamine or glycol ether solvents such as dipropylene glycol alkyl ethers such as dipropylene glycol n-butyl ether (DPnB), propylene glycol n-butyl ether (PnB), and dipropylene glycol methyl ether (DPM).

In another embodiment, the disclosures herein are related to coating compositions, matte coatings, and methods for producing them. In many embodiments, the coating compositions include a polymer (resin) component, a hydrophilic silica component and hydrophobic silica component.

The polymer component can involve one or more formulations known or developed in the coating and paint industries. One- or multi-component systems can be employed. In many cases, the system is water-based and/or gives rise to a clear coating. As used herein, the terms "water-based", "water-borne", or "water-reducible" as applied to a polymer, resin, coating system, etc., refers to compositions, dispersions or formulations in which the polymer, resin, system, etc. is present in an aqueous medium or can be dispersed or dissolved in an aqueous medium. Clear coatings are transparent. In many embodiments, the polymeric component gives rise, upon hardening, to coatings that are glossy.

Polymeric systems often are formulated for a desired end use, according to the type of surface being coated, application techniques, indoor or outdoor environments, properties in the cured product and/or other considerations. Polyurethanes, vinylics, acrylics, and hybrids, such as, for instance, polyurethane/acrylic hybrids, are just some of the possible examples that can be used to practice the various embodiments provided herein.

In addition to the resinous species, the polymeric component can include other ingredients, such as those used in paint and coating formulations, for example. Accordingly, solvents, surfactants, curing agents, emulsifiers, pigments and/or other additives can be present.

The aqueous hydrophobic silica dispersion is combined with a polymer component, for instance one used in waterborne, clear coat applications, to produce a "coating" dispersion, formulation or composition. Examples of suitable polymer components for water-based coatings include but are not limited to polyurethane, acrylic, vinyl, epoxy polymers, hybrids, such as polyurethane/acrylic hybrids, and others as known in the art. In a one-component system, the polymer component represents the entire system. In multicomponent systems the polymer component can represent one, more, or all the constituents in the system.

The aqueous hydrophobic silica dispersion can be combined with the polymer component in any desired sequence, using available equipment and techniques, as known in the art or as developed or adapted for a specific situation. For example, the aqueous hydrophobic silica dispersion can be added to one or more polymer component(s), or the component(s) can be added to the aqueous hydrophobic silica dispersion. In multicomponent systems, some or all components can be added simultaneously. In others, one polymer component is first combined with the aqueous hydrophobic silica dispersion, with the resulting composition being combined with remaining components.

Solvents, e.g., water, water-based, alcohol-based, glycol-based, water-soluble acetate-based, ketone-based, or others, as known in the art, can be used to facilitate one or more steps of the mixing process. Other ingredients, e.g., curing agents, rheology modifiers, anti-settling agents, stabilizers and/or other additives also can be present, for instance as part of the polymeric component or can be introduced before, during or after the mixing operation conducted to combine the aqueous hydrophobic silica dispersion and polymer component. In some situations, the coating compositions described herein may include solid materials other than particulate silica. Examples include color pigments, opacifiers, additional matting agents and so forth.

Typically, the aqueous hydrophobic silica dispersion and polymer component are mixed using any suitable device, for example high speed mixers such as those available from BYK-Chemie and Eiger. Mixing rates, mixing times, order in which components are being combined, whether total amounts are added in a single step or in multiple (two or more) step(s) and other parameters can vary and can be fine-tuned by routine experiments.

In some implementations, the pH of the coating composition is at least 7, for instance, from 7.5 to 9.5, e.g., from 8 to 9.

Typically, coating compositions that include hydrophilic silica, hydrophobic silica, and a polymer component, such as described above, often are stable until being applied. In some embodiments, such a dispersion remains stable for at least 15 minutes, often longer, e.g., 30 minutes, 45 minutes, one hour or longer, e.g., two, three or several hours, sometimes even for a day or more. Ready to use dispersions, manufactured to incorporate the hydrophilic and hydrophobic silica component at the point of production rather than at the point of use, can be stable for months, in many cases for a year or more.

The amount of hydrophobic silica and other silica additives present (also referred to herein as "loading") in the coating composition can vary, depending on factors such as viscosity, desired gloss level, mixing technique and/or equipment, the stability or lifetime of the dispersion, and/or other considerations. Good matting effects in conjunction with acceptable rheological properties can be obtained with total silica loadings that are from 0.1 to 30% by weight, for example, from 0.5 to 5, 1 to 10, 5 to 15, 15 to 25, or 25 to 30% by weight relative to the total solids. Total solid amounts typically include solid materials originating from the aqueous hydrophobic silica dispersion as well as solids present in the polymer component (e.g., dispersant or polymer). Also taken into account in determining total solid amounts are any other solid additives used in the preparation of a given coating composition (added silica or other matting agents, for example). Because additional silica matting agents may be included in the coating composition, the ratio of hydrophilic and hydrophobic silica originating from the aqueous hydrophobic silica dispersion to other silica matting agents such as fumed silica may be from 5:95 to 95:5, for example, from 10:90 to 90:10, from 15:85 to 85:15, from 20:80 to 80:20, from 30:70 to 70:30, from 35:65 to 65:35, from 40:60 to 60:40, or from 45:55 to 55:45.

In specific embodiments, the coating composition contains hydrophilic fumed silica, hydrophobic aerogel and another or "additional" matting agent, such as, for example, wax, another silica, e.g., precipitated silica, colloidal silica, fumed silica (for instance a fumed silica having different properties relative to any fumed silica present in the starting dispersion), another type of aerogel, other substances known to reduce gloss, combination of substances and so forth. The additional matting agent can be introduced in the coating composition in a manner that is the same, similar or different relative to that used with respect to the hydrophobic silica component.

The coating composition can be used to coat substrates such as, for example, metals, plastics, wood, metals, vinyl, concrete, various building materials, leather, artificial leather and so forth.

Both indoor and outdoor substrates can be coated, e.g., by selecting the appropriate polymer component as known in the art, as recommended by the manufacturer or as determined through routine experimentation. For example, some situations may benefit from a coating that offers some flexibility and might be somewhat less brittle, others from a very tough coating.

As an optional first step, the surface can be cleaned or otherwise prepared.

The coating composition is applied in one or more layers, using techniques and equipment known in the art or determined by routine experimentation, guidelines provided by manufacturers, prior experience and so forth. Rollers, brushes, sprays, special equipment, or other devices and/or techniques can be utilized, as known or as developed or modified for a specific situation. The coating process often involves high film build-up that can be controlled by the applicator and can reduce or minimize the number of layers needed. In many situations, the coating compositions described herein have good wetting properties and form a strong bond with the surface being coated. High solids content and few VOC issues are other characteristics of the application process. In specific implementations, the coating composition is applied as a one (single) coat system, in other words, without the need for a base and top coat. The film can be built from a single layer or by superimposing two or more layers, in which case a drying period may be required before adding a next layer. Since now the matting agent is incorporated into the coating composition, the need for an additional coat, made of a different material and containing a matting agent, is no longer necessary. Overall waiting for the drying process is significantly reduced.

Once applied to the surface, the film is allowed to cure. The curing process can be conducted according to the manufacturers' recommendations, based on experience or can be established by routine experimentation. In many cases, curing takes no longer than the curing of a control film which does not contain hydrophilic and hydrophobic silica. As used herein, the term "control" as applied to a coating composition or resulting dry film, refers to a coating composition or resulting dry film prepared without silica.

Typical times required for the cure can range from about 2 minutes (at elevated temperatures) to about 7 days at room temperature. In many cases, curing is completed after 2 to about 8-10 hours at room temperature. The fast cure rates possible in some cases can reduce or eliminate bubble formation. As known in the art or as recommended by the manufacturer, selecting a particular polymeric system can affect curing rates.

Curing typically takes place at ambient conditions. Higher or lower temperatures also can be employed. It is important to note here that the hydrophobic silica component described herein is compatible with a wide range of temperatures, e.g., from room temperature to 300° F., in some cases from room temperature to 100, 150, 200 or 250° F.

Situations that require additional coats may arise, warranting, for example, the use of a primer (base) coat, applied to the substrate in one or more layer(s), before the coating composition (containing fumed silica and aerogel), and/or a top or finishing coat applied over the cured or hardened coating composition. Although not required for obtaining the matting effects and/or other properties described herein, a top coat can be added to further modify mechanical properties, increase abrasion resistance, esthetics and/or for other reasons. If more than one layer is applied, a drying period is allowed between applications.

While in general the hydrophilic and/or the hydrophobic silica is/are present in a coat or layer thereof that consists of, consists essentially of or comprises the coating composition described herein, the same or a different hydrophobic silica and/or hydrophilic silica also can be present in another coating layer, for instance in a top coat or a base coat, if such a top coat or base coat is being used.

A coating layer containing hydrophilic silica and hydrophobic silica can have a thickness from 2 microns (μm) to 20 mm, e.g., from 2 to 3, 4, 5, 6, 7, 8, 9, or 10 μm, from 10 μm to 15 or 20 μm, from 20 to 25, 30, 35, 40, 45, or 50 μm; from 50 to 55, 60, 65, 70, 75, 80, 85 or 100 μm, from 100 μm to 150, 200, 250 or 300 μm; from 300 μm to 400 or 500 μm; from 500 to 600, 700 or 800 μm; from 800 to 900 μm or to 1 mm; from 1 mm to 1.5 or 2 mm; from 2 mm to 3, 4 or 5 mm; from 5 mm to 6, 7, 8, 9 or 10 mm; from 10 mm to 12, 13, or 15 mm; or from 15 mm to 17, 18 or 20 mm. One, two or more coating layers can be employed, resulting in an overall dry film (measured from the interface with the substrate to the uppermost surface in contact with the surrounding atmosphere) having a thickness, also referred to herein as the overall film thickness, of at least 2 μm. Other layer and/or film thicknesses can be employed.

Properties of the coatings described herein can be evaluated as known in the art, relying, for instance, on standard procedures, e.g., ASTM standards, manufacturer recommendations, and/or other testing products and/or protocols.

An important attribute of the coatings disclosed herein relates to their matte appearance or reduced gloss. Commercial instruments and/or techniques for measuring gloss are available and well known. For example, gloss and sheen properties can be evaluated using Leneta charts, available, e.g., for the testing of paints and coatings, according to standards or protocols such as, for instance, ASTM D-3928. In many cases, gloss is evaluated using a glossmeter, an instrument designed to provide a quantifiable way of measuring gloss intensity in which the precise illumination and viewing conditions are defined. In glossmeters, the configuration of both illumination source and observation reception angles allows measurement over a small range of the overall reflection angle. The measurement data obtained are related to the amount of reflected light from a black glass standard with a defined refractive index. The ratio of reflected to incident light for the specimen, compared to the ratio for the gloss standard is sometimes given as gloss units (GU). The measurement angle refers to the angle between the incident light and the perpendicular. Three measurement angles (20°, 60°, and 85°) are specified and are found to cover many coatings applications. The angle is selected based on the anticipated gloss range.

In many implementations, the coatings described herein have, when dried, a gloss that is less than the gloss of a control coating prepared with the same methods and the same composition except without the use of particulate silica. In some cases, gloss, measured at 60°, is reduced by at least 15%, for example, at least 20%, at least 30%, for example, from 40% to 90% or more, from 50% to 80%, or from 60% to 70% compared to the gloss of the control coating.

Gloss can be tuned to a desired level by adjusting the amount of matting agent added and/or other composition parameters. This can be accomplished by routine experimentation, by simply following the manufacturer's recommendations, prior experiences or other factors. In some implementations, the amount of a hydrophobic silica, e.g., hydrophobic silica aerogel or hydrophobic fumed silica, needed to achieve a desired gloss level is lower than that of a hydrophilic silica, e.g., fumed silica or precipitated silica, required to achieve the same desired gloss level.

Haze is typically measured with a haze-gloss reflectometer. The reflectometer is designed to measure specular gloss and reflection haze on paint coatings, plastics, binders, pigments and metal surfaces (mirror reflection). The technique involves the sample surface being illuminated at a defined angle and the reflected light is measured photoelectrically. Selection of the appropriate angle of illumination (geometry) is dependent on the specific gloss level of the same surface: matte, medium or high gloss.

Coatings that include hydrophobic and hydrophilic silica, as described herein, often have haze values higher than the haze value of a control coating based on the same polymeric component but without these materials.

Various methods and equipment have been or are being developed to investigate other properties relevant to coatings and can be used to study the coatings disclosed herein. It has been found, for example, that Konig and/or pencil hardness is/are not significantly negatively affected by the addition of hydrophilic and hydrophobic silicas such as fumed silica and aerogel. The use of hydrophilic silica and hydrophobic silica in coatings according to the various embodiments herein need not reduce the Konig hardness by more than 6%, for example, by more than 5%, more than 4%, or more than 3%, with respect to a control coating produced in the same manner but without particulate silica. That is, the coating may have a Konig hardness at least 94%, e.g., at least 95% as great, etc., as that of the control coating. Indeed, in some embodiments, the use of particulate silica increases the Konig hardness.

In some implementations, the coatings described herein can withstand relatively wide temperature ranges without cracking, peeling or other negative effects. Illustrative temperatures are from −120° F. to 300° F., e.g., from −120, −100, −75, −50, −20° F. to room temperature or from room temperature to 100, 150, 200, 250 or 300° F.

Many of the coatings are found to have water and/or alcohol resistance as evaluated, for example, by techniques described in U.S. Pat. No. 6,478,864. In other embodiments, the coating can provide corrosion resistance, brought about by the combined and possibly synergistic effects of hydrophobic and hydrophilic silicas.

Other attractive properties that may characterize coatings according to embodiments described herein include but are not limited to: UV stability with no yellowing being expected, clarity and reduced blush from moisture in the concrete, a high abrasion and scratch resistance similar to polyurethane, durability, tolerance to heat and temperature variations, stain and impact resistance, and others.

In some embodiments, desirable coating properties, e.g., low gloss, high clarity or low haze, mechanical properties and others, are achieved by optimizing ratios of ingredients, specific type of hydrophilic and hydrophobic silicas, base dispersion selected, mixing conditions, viscosity, stability or other attributes of precursor dispersions and so forth.

Adding other solids, matting agents such as wax or precipitated silica, for example, can influence properties of a resulting coating, compared to a comparative coating that contains, e.g., only hydrophobic aerogel and hydrophilic fumed silica. It has been found that introducing a matting agent other than the hydrophilic particulate silica and hydrophobic particulate silica of the aqueous hydrophobic silica dispersion can, in some cases, lower gloss without unacceptable increases in the viscosity of precursor dispersions.

In some cases, coatings described herein have water/humidity resistance, alcohol resistance, stain resistance, corrosion resistance, dust pick-up resistance and/or other properties.

The aqueous hydrophobic silica dispersions provided herein may also be used to prepare blankets and other flexible insulating structures such as those described in US Patent Publication No. 2017/0101773 to Doshi, et al., and U.S. Pat. No. 7,635,411 to Rouanet, et al., the entire contents of both of which are incorporated herein by reference. A treatment slurry may be prepared by combining additional ingredients such as binders, fibers and other additives with the aqueous hydrophobic silica dispersion. Other additives include but are not limited to opacifiers, viscosity regulators, curing agents, agents that enhance or slow down the rate at which a binder hardens, agents or materials that promote mechanical strength, viscosity regulators, pH modifiers, plasticizers, lubricants, reinforcements, fire retardants, and others. Combinations of other ingredients also can be utilized. The additional ingredients may serve to better retain the particulate silica on a lofty fibrous structure, or batting, or other substrate and impart other desirable properties, such as color or fire retardance.

Suitable binders include but are not limited to gypsum, cements or components thereof, magnesium salts, silicates, polymers, latex compositions, and other organic or inorganic materials or compositions containing such. Fibers may include mineral wool fibers, biosoluble ceramic fibers, carbon fibers, polymer-based fibers, metallic fibers, cellulose fibers, plant derived fibers, or woven, non-woven, or chopped forms of continuously-made glass or stone fibers.

Fibers may have any shape, for example, round, multi-lobal, in the form of strips, or with shapes similar to fir trees or dumbbells. Fibers may be hollow and may be smooth or crimped. Typical fibers have elongated, e.g., cylindrical, shapes with length to diameter ratios greater than 1, for example, greater than 5, 8, or 20. Fibers may be woven, non-woven, chopped, or continuous. Fibers may have one or more than one component, e.g., a core of one material and a sheath of a second material. Fibers may be loose, chopped, bundled, or connected together in a web or scrim. Fibers may be modified by conventional additives, for example, anti-static agents, dyes, pigments, or IR opacifiers, or mixtures of two or more of these.

Amounts of binders, fibers, and other ingredients added may depend on specific applications and other factors. Thus, other ingredients can be present in the treatment slurry, in amounts greater than 0 weight % of the total weight of the mixture, e.g., greater than 2 weight %, for example greater than 5 weight %, greater than 10 weight %, greater than 15 weight %, greater than 20 weight % or greater than 25 weight %. They can be present in the treatment slurry in amounts that are less than 90% by weight, e.g., less than 75 weight % or less than 50% by weight.

The batting may be woven or non-woven and may be made from any suitable material, e.g., metal oxide fibers such as glass fibers, mineral wool fibers, biosoluble ceramic fibers, carbon fibers, polymer-based fibers, metallic fibers, cellulose fibers, plant-derived fibers, or any combination of these. The batting may be flexible and may be made of two or more layers.

The batting may be coated or impregnated with the treatment slurry by various processes. In many embodiments, the batting layer or layers are impregnated with the slurry. In one example, the slurry is applied to a first batting layer, which is then covered by a second batting layer. Slurry is then applied to the second batting layer and the process is continued for the desired number of layers. In further implementation, the method selected is suitable for scale-up or industrial processes such as, for example, air-laid and/or roll to roll manufacturing.

Specific techniques contemplated for applying the slurry to the batting include but are not limited to: dipping or immersing the batting in the slurry, e.g., with or without bath agitation, pouring of the slurry over the batting, infusion, spraying or painting of the batting with the slurry, and/or other processes, e.g., as known in the art. Soaking the batting in the slurry may be particularly useful in impregnating multi (two or more) layered battings. In specific implementations, the soaking may be conducted in the presence of shaking, stirring, or another suitable form of agitation for the entire soaking period or for a lesser time interval. Intermittent agitation of the immersion bath also can be employed.

Applying the slurry to the batting can be conducted at ambient conditions, e.g., room temperature and/or atmospheric pressure or at other suitable conditions. For instance, the batting can be treated at temperatures higher than room temperature. Pressure differentials can be used, for instance, to promote penetration of the slurry through web openings in the batting.

The treated batting can be dried, e.g., at room temperature or at a higher than room temperature, using air or special atmospheres, e.g., inert gas. Drying can be carried out by simply allowing the slurry to dry or by using an oven, drying chamber, gas flow directed to the slurry-containing batting, drawing a vacuum through the treated batting, or any other suitable drying apparatus, e.g., as known in the art. In specific examples, the drying step is conducted using equipment and/or techniques suitable for a scale-up or industrial manufacturing process.

Alternatively or in addition, the treatment slurry may be formed directly into a blanket without the use of a batting by dewatering using a wire screen, filter, or other apparatus or method known to those of skill in the art. Gentle stirring during dewatering may reduce separation of the various components due to density differences. In one embodiment, the treatment slurry is dewatered by filtering on a wire screen using any suitable wet laid technique known to those of skill in the art, such as that disclosed in U.S. Pat. No. 5,399,422. Multi-layered structures may also be prepared by pre-forming layers and laminating them together or forming multiple layers sequentially. The various layers may have the same or different compositions.

The resulting filtered mixture or mixtures can then be pressed to remove water and increase web density, dried at a predetermined temperature and pressure and be calendared at a predetermined temperature and/or pressure to form the blanket of the present invention. The filtered mixture of aerogel particles and fibers can be pressed and dried at a predetermined temperature by any known method and/or instrument. Rotary presses can be used for web dewatering and compression. Drying can be accomplished by steam-heated cylinders or by high velocity air drying or by radiant heat. Preferably, the filtered mixture is dried at a temperature at which the wetting agent volatizes or decomposes so that the hydrophobicity of the hydrophobic silica particles is satisfactorily recovered. Additionally, the drying process can also cause some or all of the fibers to bond to one another and/or to the silica. Preferably, the filtered mixture is further dried at a temperature of at least 100° C. and, more preferably, at a temperature of at least 120° C. The dried mixture, which can be in the form of a web, can then be, at least partially, further thermally bonded with a hot calendar, preferably a hot calendar roll, to form a strong and relatively dust-free blanket or composite material. The dried mixture/web can also be calendared to a predetermined density at a predetermined temperature and time.

In another embodiment, the aqueous hydrophobic silica dispersion may be used to prepare a coating for a textile. The textile may be in any form known to those of skill in the art, including but not limited to fibers, yarns, threads, ply yarns, fabrics produced from fibers and/or yarns, and the finished products produced from fibers, yarns, and/or fabrics. The textile material can be a fiber, a yarn, or a fabric. The textile material can be woven, knitted, crocheted, bonded and/or non-woven fabric. The textile material can woven, knitted, crocheted, melt-blown, bonded, needle punched non-woven fabric, and polar terry fleece, or loop fabric, either of one side or both sides. The textile material can be spun, electrospun, melt-blown, drawn or extruded. The textile material can be a mesh.

The aqueous hydrophobic silica dispersion may be used to coat textiles comprising one or more of rayon, nylon, non-acrylic olefin, acrylic polyester, polyethylene, polyphenylene ether, polytetrafluoroethylene, polyester, polypropylene, viscose, carbon fiber, aramids, polybenzimidazole fiber, polylactic acid, acrylonitrile, wool, cotton, cellulose, silk, linen, viscose, hemp, ramie and jute. Alternatively or in addition, the textile material may include a stretch yarn or fleece.

The textile may be treated with the aqueous hydrophobic silica dispersion or a treatment dispersion prepared from the aqueous hydrophobic silica dispersion using any method known to those of skill in the art. For example, the textile, depending on its configuration, may be dipped, knife coated, roll coated, padded, calendared, extrusion coated, or foam finished coated.

Various additives may be combined with the aqueous hydrophobic silica dispersion to form a treatment dispersion for textiles. Appropriate additives include the additives discussed above for use with blankets and battings, anti-microbial agents, resins, and other additives known to those of skill in the art.

The hydrophobic and hydrophilic silica in the aqueous hydrophobic silica dispersion may impart hydrophobicity, haptic properties, or, in the case of hydrophobic aerogel, thermal insulation properties to the textile. Alternatively or in addition, the silica may reduce the coefficient of friction of the textile with respect to processing equipment such as sewing machines or with respect to itself.

In another embodiment, the aqueous hydrophobic silica dispersions may be used for underwater palletization of polymers. Certain polymers have a problem that the pellets made of the polymer tend to adhere to each other during the transport and storage. This often causes problems in downstream process steps, such as blending, storage and packaging. Coating or sizing these pellets with an anti-tacking or antiblock agent can prevent or alleviate such adhesion. Because of the extreme tackiness of the pellets, they are often extruded in the molten state through a die plate having a plurality of holes into a bath. The aqueous hydrophobic silica dispersion may be used as the bath without the need to include additional binders. Suitable polymers include polyolefins, polyesters, and other thermoplastic polymers. However, any material that can be pelletized may benefit from the use of the aqueous hydrophobic silica dispersions disclosed herein. For example, U.S. Pat. No. 8,303,871, issued to Boothe, et al., discloses pelletizers for materials such as waxes, asphalts, adhesives, gum base formulations, high melt-flow polyolefins, and non-polymeric organic and/or inorganic compounds. The use of hydrophobic silica may broaden the types of polymers that may be processed using underwater pelletization, as the surface interactions that adhere the hydrophobic silica to the surface of the polymer are different than for hydrophilic silica.

The aqueous hydrophobic silica dispersions disclosed herein may also be used to incorporate silica into polymers during suspension polymerization. The aqueous hydrophobic silica dispersion may be formulated with monomer, which may then be polymerized.

The aqueous hydrophobic silica dispersions disclosed herein may also be used to incorporate silica into a polymer via extrusion. Exemplary methods are disclosed in EP1401924, the contents of which are incorporated herein by reference.

The invention is further described by the following non-limiting examples.

EXAMPLES

Several experiments were conducted to investigate properties of coating formulations containing aqueous hydrophobic silica disperions. Generally, a fumed silica was provided in a "starting" or "base" composition, typically a dispersion. Hydrophobic particulate silica materials were added to the base to form aqueous hydrophobic silica dispersions. A resin system suitable for coating applications was then combined with the aqueous hydrophobic silica dispersion to produce the "final" or "coating" formulation. The coating formulation was studied prior- and post-cure for properties such as viscosity, gloss, hardness and other attributes relevant in the development and manufacture of coating formulations.

Three commercial base compositions were utilized in the examples below. The first, Cab-O-Sperse® PG 022 dispersion, available from Cabot Corporation, was a base dispersion characterized by a pH of 3.8, a viscosity below 100 centipoise (cP), a specific gravity of 1.125 and a solids content (loading) of 20% by weight. The solid in the base dispersion was a hydrophilic fumed silica characterized by a surface area of about 200 $m^2/g$, submicron particle size, a uniform particle size distribution with a mean of less than 0.2 microns and a cationic surface charge.

The second Cab-O-Sperse® 1015A dispersion, available from Cabot Corporation, was characterized by a pH of 6.0, a maximum viscosity of 40 cP and a specific gravity of 1.089. It contained a low (about 90 $m^2/g$) surface area fumed silica characterized by negatively charged particles (approximate average particle size of 20 nanometers (nm)), in an aqueous medium stabilized with ammonium hydroxide. The fumed silica loading was about 15%.

The third, Cab-O-Sperse 2017A dispersion, available from Cabot Corporation, was characterized by a maximum viscosity of 150 cPs, a pH of 9.8, and a specific gravity of 1.099. It includes a fumed silica with a BET surface area of about 200 $m^2/g$ in an amount of 17 weight % in an aqueous medium stabilized with ammonium hydroxide.

Base dispersions were also prepared directly with Cab-O-Sil EL-90 and M-5 fumed silicas. L-90 silica has a nominal BET surface area of 90 $m^2/g$; M-5 silica has a nominal BET surface area of 200 $m^2/g$.

Matting agents in the examples include translucent aerogel, available from Cabot Corporation under the designations ENOVA® MT1100, IC3120, and IC3130 aerogel, opaque aerogel, available from Cabot Corporation under the designation ENOVA® MT1200 aerogel, Cab-O-Sil TS-720 silica, which is treated with polydimethylsiloxane, and CAB-O-SIL TS-530 silica, which is treated with hexamethyldisilazane. The aerogel materials have a methanol number greater than 80. TS-720 silica has a methanol number of about 72. TS-530 silica has a methanol number of about 63.

Other solids added when preparing matting compositions included a micronized precipitated silica, available, for example, from Evonik Industries AG, under the designation of ZEOTHIX® 95 silica. Typically used as a rheology modifier, flattening agent and matting agent, ZEOTHIX® 95 has a reported average particle size of 8.5 microns and a surface are (BET) of 180 $m^2/g$.

Also used as an agent added to the fumed silica already present in the base was a hydrophobized fumed silica having a typical surface area of 125 $m^2/g$, available under the designation CAB-O-SIL® TS-610 silica, available from Cabot Corporation and considered suitable for both polar and non-polar resin systems, especially when case of dispersion is a primary formulation consideration. This silica has a methanol number of about 37.

Another material added in some experiments was a polyethylene micronized wax alloy showing melting peaks ranging from 92-141° C. and recommended for liquid inks or other water and solvent-based systems. This material is available commercially from Shamrock Technologies, Newark, NJ under the designation S-363.

For a polyurethane-acrylic coating formulation, the system selected was a high solids water-borne urethane/acrylic copolymer for air dry coating, typically used for general and automotive plastics, metal coatings, floor finishes and brushing varnishes, available commercially from DSM Coating Resins, LLC, PO Box 615 8000 AP Zwolle, The Netherlands, under the designation NeoPac™ R-9699 water borne urethane/acrylic copolymer.

Another resin system utilized was an air-dry, water-borne urethane formulation available under the designation of NeoRez™ R-960 waterborne urethane from DSM Coating Resins, LLC, PO Box 615 8000 AP Zwolle, The Netherlands, and recommended for high performance uses, where hardness, flexibility, chemical and abrasion resistance are required. The aliphatic backbone of NeoRez™ R-960 waterborne urethane is thought to result in UV resistance, permitting its use in exterior coating applications. Clear coatings based on NeoRez™ R-960 resin are reported to compare favorably with high performance conventional solvent-borne urethane lacquers.

Also used was a modified acrylic emulsion for wood finishes available under the designation Neocryl® A-6016 waterborne acrylic from DSM Coating Resins. Known for mar resistance and toughness and forming water resistant films which are very clear and glossy, NeoCryl® A-6016 waterborne acrylic is often used as industrial kitchen cabinet and furniture finishes due its UV stability, high gloss, good wet adhesion and chemical resistance.

Also used was a polyurethane polycarbonate resin under the designation Permutex EVO EX-RU-92-605 resin, available from Stahl Holdings B.V. an acrylic, Neocryl E-160 resin, available from DSM Coating Resins, and Neocryl XK-98 emulsion, an anionic acrylic copolymer emulsion available from DSM Coating Resins. NeoCryl XK-98 emulsion is recommended for both clear and pigmented topcoats and for coating PVC. All resins were used as provided by the manufacturer.

In addition to resins and the solid particulate materials mentioned above, the aqueous hydrophobic silica dispersion and/or coating formulations included solvents, rheology modifiers, surfactants, curing agents, and/or other ingredients often used in dispersing solids and common in the making of coating formulations. Specific dispersants used in the examples below were: DisperBYK 190 compound (BYK Chemie), a non-ionic dispersant having styrene, polyoxyethylene and polyoxypropylene blocks with an EO:PO ratio of about 3, DisperBYK 192 compound (BYK Chemie), Solsperse 46000 compound (Lubrizol Corporation) a non-ionic dispersant containing polyoxyethylene, Jeffamine M-2070 compound (Huntsman), a monofunctional, primary amine with a weight average molecular weight of about 2,000 and a propylene oxide/ethylene oxide (EO/PO) mol ratio of 31/10 and an HLB value of 13.8, Jeffamine M600 compound (Huntsman), a monofunctional, primary amine with a weight average molecular weight of about 600 and a propylene oxide/ethylene oxide (EO/PO) mol ratio of 1/9 and an HLB value of 2, Jeffamine ED900 compound (Huntsman), a difunctional primary amine with an EO/PO ratio just greater than 2 and a weight average molecular weight of about 900, Surfonamine L-300 compound (Huntsman), a monofunctional, primary amine with a EO/PO ratio of about 58/8, a weight average molecular weight of about 3000 and an HLB of about 17.1. Surfonamine B-200 compound, a monofunctional, primary amine with an EO/PO ratio of about 6/29 and a weight average molecular weight of about 2000, and Petrolite D1038 compound (Baker Hughes Inc.), a non-ionic alkyl polyoxyethylene ester. Additional compounds used in the examples below included dimethylethanolamine (DMEA), used in the coatings industry and as a curing agent for polyurethanes and epoxy resins; BYK-024 silicone based defoamer (BYK Chemic), BYK-346 additive, a silicone surfactant often utilized in aqueous coatings (BYK Chemie); butyl cellosolve (Dow); Dehydran® 1293 defoamer (BASF), a modified polysiloxane; and solvents such as: Dowanol DPM glycol ether; Dowanol PnB glycol ether and Dowanol DPnB glycol ether.

Unless otherwise specified, quantities shown in the tables below are in grams (g).

Ingredients for aqueous hydrophobic silica dispersions were mixed with a Dispermat (CV, CV-3 or D51580) mixer unless otherwise noted. Generally, ingredients for resin-based formulations were mixed with an overhead laboratory mixer. Typically, solids were added incrementally, each addition being followed by a mixing step and in many cases by evaluating the viscosity of the dispersion to ensure that it could still be stirred before proceeding with the next addition.

Ingredients for aqueous hydrophobic silica dispersion formulations with resin were mixed with a Stir-Pak Heavy Duty Mixer Head (model #SSM36, part #50007-40) attached to a Stir-Pak Speed Controller (model #SSC30, part #50007-00). The speed controller settings are 1-10, 1 correlating to the lowest RPM which is dictated by the minimum RPM of the mixer head, in this case 60 RPM, and 10 correlating to the highest RPM of the mixer head, in this case 6000 RPM. When stirring, a small vortex is created. Depending on the viscosity of the samples, the number on the speed controller will need to decrease with lower viscosity and increase with increased viscosity.

Evaluation of fineness of grind in the examples below indicates use of the Hegman grind method. The Hegman grindometer used was supplied by Paul N. Gardner Co., Inc. and evaluations were carried out according to the manufacturer's directions. Suitable samples containing ENOVA MT1100 and MT1200 aerogel exhibited a grind of at least 4 or 5. Suitable samples containing other acrogels exhibited a grind of at least 2 or 3. Where samples did not exhibit suitable Hegman grind, mixing was continued under the same conditions until an appropriate Hegman grind was achieved.

Viscosity measurements were obtained using a Brookfield Viscometer, Model DV-I+, employing the following procedure. After the instrument is powered up, the chiller is turned on and the temperature set to 25° C. The instrument is then zeroed using the auto zero process as instructed by the instrument display. A spindle is selected by pressing the "set spindle" function until the chosen spindle (RV Spindle set, RV-1 through RV-7) is highlighted. The "set spindle" function is pressed again to enter the selection. A small sample cup is partly filled with the dispersion/formulation to be tested. If using a disk type geometry, the disk is placed into the dispersion/formulation and rotated gently to release any air that might be trapped under the disk. Bullet-shaped geometries can be attached directly to the spindle. The sample cup is then placed in the jacketed holder on instrument, and, if not already attached, the geometry is screwed onto the spindle. Using a pipette, the sample cup is filled to about 2.5 mm from the top and the speed is set to 10 rpm. The motor is turned on and the system is allowed to equilibrate for a minute at 10 rpm. This is repeated at 20 rpm, 50 rpm and 100 rpm. After equilibrating for one minute at 100 rpm, the test is complete and the motor is turned off.

In conducting the experiments described below, viscosity was considered satisfactory if the resulting material could be used to make a film, for example, if it could be pipetted and air bubbles could escape from the film. If the viscosity was not satisfactory, mixing was continued under the same conditions until the material was suitable.

Films were cast on a suitable substrate, such as, for example, Leneta test charts, cold-rolled steel (CRS) panels, or others known in the art. Generally, the application of the coating dispersion or coating composition to the substrate was performed using a 3 mil wet drawdown bar manufactured by BYK.

Bake cure was generally conducted at 150° F. for 30 min, following a 10 min. flash-off cycle at room temperature. These operations served to remove organic materials such as solvents and other additives and harden the coating. The equipment used was Grieve double door solvent rated oven.

Haze values of the various samples were measured with a Gloss and Haze meter from BYK. Gloss was evaluated at 20, 60 and 85° using a Gloss and Haze Meter from BYK on 3 mil thick (wet) drawn down coatings on steel substrates unless otherwise noted.

Konig hardness was measured with a BYK-Gardner Konig hardness tester according to the manufacturer's instructions. Pencil hardness was determined according to ASTM D3363. Test Method for Film Hardness by Pencil Test. Both tests were performed on films drawn down on steel substrates. Single point Konig hardness testing was performed following the bake cure method described above. The development of Konig hardness over time was measured on coatings that were allowed to dry at room temperature.

EXAMPLES

Example 1

Polyurethane-acrylic dispersions were prepared and studied with respect to dispersion attributes (viscosity, for example) as well as gloss and other properties of the cured product.

Matting agents were provided via aqueous hydrophobic silica Dispersions I and II. The starting material for both aqueous hydrophobic silica dispersions was Cab-O-Sperse® PG 022 dispersion.

Both aqueous hydrophobic silica dispersions contained ENOVA® MT1100 translucent aerogel having the properties shown in Table 1. In addition to this aerogel, dispersion II also contained ZEOTHIX® 95 micronized precipitated silica.

Details regarding the protocol followed in preparing Dispersions I and II are presented in Table 2 below.

TABLE 2

|  | Dispersion I Aerogel | Dispersion II Aerogel + Zeothix 95 silica |
|---|---|---|
| Base PG 022 Dispersion | 1600 | 1600 |
| Premix at 1000-3000 rpm, then add: | | |
| Water | 80.00 | 80.00M |
| JEFFAMINE M-2070 dispersant | 80.00 | 80.00 |
| Add Under Mixing at 1000-3000 RPM: | | |
| Aerogel | 40 | 40 |
| Mix for 5 minutes at 1,000 RPM | | |
| If Viscosity satisfactory: | | |
| Aerogel | 40 | 40 |
| Mix for 5 minutes at 1,000 RPM | | |
| If Viscosity satisfactory: | | |
| BYK-024 defoamer | 2 | 2 |
| Mix for 5 minutes at 1,000 RPM | | |
| If Viscosity satisfactory: | | |
| Matting Agent | 60 (Aerogel) | 80 (Zeothix 95 silica) |

TABLE 2-continued

|  | Dispersion I Aerogel | Dispersion II Aerogel + Zeothix 95 silica |
|---|---|---|
| Mix for 10 minutes at 2,000 RPM |  |  |
| If Viscosity satisfactory: |  |  |
| 10 g DMEA and 90 g water | 85 | 85 |
| Total | 1987 | 2007 |
| Mix for 10 more minutes at 2,000 RPM |  |  |

Dispersions I and II were added to a polyurethane-acrylic composition (NeoPac™ R-9699 water borne urethane/acrylic copolymer), as described in Table 3 to form Compositions I and II:

TABLE 3

|  | Composition I (NeoPac™ resin + Dispersion I) | Composition II (NeoPac™ resin + Dispersion II) |
|---|---|---|
| Neo Pac ™ R-9699 resin | 200.00 | 200.00 |
| Add under agitation, stirring at setting 2 on speed controller: |  |  |
| Dispersion | 13.8 | 13.8 |
| DMEA (as 20% solution in water) | 1.38 | 1.38 |
| Mix for 10 minutes stirring at setting 2 on speed controller |  |  |

Additional ingredients were added to Compositions I and II from Table B (Example 1) as shown in Table C (Example 1) and the viscosity of the resulting Coating Dispersions I and II was measured. Also shown in Table 4 is a control composition prepared using the same resin component but in the absence of a aqueous hydrophobic silica dispersion.

TABLE 4

|  | Coating Dispersion I Neopac™ resin + Matting agent | Coating Dispersion II Neopac™ resin + Matting agent | Control NeoPac™ resin Only |
|---|---|---|---|
| NeoPac ™ R-9699 resin | 106.90 | 106.90 | 100.00 |
| Stir resin at setting 2 on speed controller. Preweigh the ingredients below, and then add to above: |  |  |  |
| Butyl cellosolve | 8.00 | 8.00 | 8.00 |
| Dowanol DPM glycol ether | 4.00 | 4.00 | 4.00 |
| Dehydran 1293 defoamer | 0.60 | 0.60 | 0.60 |
| BYK 346 additive | 0.40 | 0.40 | 0.40 |
| Water | 4.60 | 4.60 | 4.60 |
| Viscosity (cP) | 82.50 | 93.40 | 78.50 |

A more marked increase in viscosity was observed with the addition of precipitated silica. Relative to the control formulation, however, the viscosity build-up observed with the use of matting agents present in Coating Dispersions I or II was within acceptable limits.

Coatings I and II, prepared as described above, were evaluated for haze, gloss and Konig hardness. The results are shown in Tables 5 and 6.

TABLE 5

| Konig Hardness | Coating I | Coating II | Control |
|---|---|---|---|
| 2 hours | 11.00 | 10.00 | 9.00 |
| 4 hours | 22.00 | 20.00 | 18.00 |
| 8 hours | 39.00 | 40.00 | 37.00 |
| 24 hours | 48.00 | 49.00 | 40.00 |
| 7 days | 56.00 | 57.00 | 46.00 |

TABLE 6

|  | Coating I | Coating II | Control |
|---|---|---|---|
| Gloss, 20 | 7.9 | 7.6 | 104.0 |
| Gloss 60 | 16.5 | 15.6 | 107.0 |
| Haze | 502 | 526 | 510 |

The data indicate that the matting agents did not significantly change haze or the Konig hardness relative to the control. Gloss, however, was considerably reduced in both Coating I and Coating II.

Example 2

The following aqueous hydrophobic silica dispersions, I, II and III, were prepared starting with the same base dispersion as that described in Example 1, namely CAB-O-SPERSE PG 022 dispersion. The three formulations included, respectively: (I) ENOVA® MT1100 aerogel; (II) a combination of the same ENOVA® MT1100 aerogel and Zeothix 95 precipitated silica; and (III) a combination of the ENOVA® MT1100 aerogel and S363 micronized wax material. The procedure used is shown in Table 7.

TABLE 7

|  | I | II | III |
|---|---|---|---|
| Base Dispersion (PG 022 dispersion) | 400.00 | 400.00 | 400.00 |
| Premix at 1000-3000 rpm then add the following |  |  |  |
| Water | 20.00 | 20.00 | 20.00 |
| Jeffamine M2070 dispersant | 20.00 | 20.00 | 20.00 |
| Add the following under mixing at 1000 RPM |  |  |  |
| Aerogel | 10 | 10 | 10 |
| Mix for 5 minutes at 1000 RPM, if the viscosity is satisfactory, then add |  |  |  |
| Aerogel | 10 | 10 | 10 |
| Mix for 5 minutes at 1000 RPM, if the viscosity is satisfactory, then add |  |  |  |
| BYK024 | 0.5 | 0.5 | 0.5 |
| Mix for 10 minutes at 2000 RPM, if the viscosity is satisfactory, then add |  |  |  |
| Matting Agent Amounts: | 5 | 5 | 5 |
| Matting Agent Type: | Aerogel | ZEOTHIX 95 silica | S363 wax |
| Total: | 465.50 | 465.50 | 465.50 |
| Total solids, % | 26.85 | 26.85 | 26.85 |

The three dispersions were further evaluated as described in Example 3 below.

Example 3

The Dispersions I, II, and III, prepared in Example 2 above, were used in conjunction with a polyurethane system (NeoRez™ R-960 waterborne urethane) to prepare several coating compositions. The designations "low" and "high" refer to the relative loading selected.

The protocol followed to prepare a control and experimental urethane-based coating compositions is detailed in Table 8. Fineness of grind indicates use of the Hegman grind method as described above.

TABLE 8

| | A Control | B I-low | C I-high | D II-low | E II-high | F III-low | G III-high |
|---|---|---|---|---|---|---|---|
| Resin[a] | 50.00 | 50.00 | 50.00 | 50.00 | 50.00 | 50.00 | 50.00 |
| Stir resin at setting 2 on speed controller. Preweigh the ingredients below, and then add to above. | | | | | | | |
| Water | 0.85 | 0.85 | 0.85 | 0.85 | 0.85 | 0.85 | 0.85 |
| BYK-346 additive | 0.10 | 0.10 | 0.10 | 0.10 | 0.10 | 0.10 | 0.10 |
| Dehydran 1293 defoamer | 0.15 | 0.15 | 0.15 | 0.15 | 0.15 | 0.15 | 0.15 |
| Dowanol DPM glycol ether | 0.25 | 0.25 | 0.25 | 0.25 | 0.25 | 0.25 | 0.25 |
| Total | | 51.35 | 51.35 | 51.35 | 51.35 | 51.35 | 51.35 |
| Add to the above under agitation (setting 2) | | | | | | | |
| Dispersion | None | I-low | I-high | II-low | II-high | III-low | III-high |
| Dispersion amount | 0.00 | 1.12 | 2.24 | 1.12 | 2.24 | 1.12 | 2.24 |
| Solid matting component percentage relative to solid resin used | 0 | 1.76 | 3.53 | 1.76 | 3.53 | 1.76 | 3.53 |
| Mix for 20 minutes at high speed (setting 2) then check for fineness of grind. | | | | | | | |

[a]NeoRez ™ R-960 waterborne urethane at a solid loading of 34%.

The pH and viscosity values observed for the various coating compositions are shown in Table 9 below.

TABLE 9

| | A Control | B I-low | C I-high | D II-low | E II-high | F III-low | G III-high |
|---|---|---|---|---|---|---|---|
| pH | 8.10 | 8.20 | 8.40 | 8.50 | 8.40 | 8.50 | 8.60 |
| Viscosity | 125.00 | 118.00 | 129 | 128 | 136 | 132 | 136 |

Test panels were prepared by casting out the coating composition on Leneta 2C charts using 3 mil wet drawdown bar. The cure operation involved flash off at room temperature for 10 minutes and a bake cycle at 150° F. for 30 minutes. The resulting coatings had the properties shown in Table 10 below and FIGS. 1 through 4.

TABLE 10

| | A Control | B I-low | C I-high | D II-low | E II-high | F III-low | G III-high |
|---|---|---|---|---|---|---|---|
| Gloss, 20 | 102.0 | 82.0 | 74.0 | 75 | 52.0 | 74 | 52 |
| Gloss, 60 | 106.0 | 86.0 | 78.0 | 78 | 60.0 | 82 | 59 |
| Haze | 478.0 | 504.0 | 506.0 | 540.0 | 550.0 | 557.0 | 565.0 |
| Konig hardness | 32.0 | 33.0 | 34.0 | 35.0 | 35.0 | 34.0 | 35.0 |

In general, all experimental samples showed a reduction in gloss relative to the control sample. In the polyurethane system tested in this example, the combination of translucent aerogel and micronized wax, in particular when the aqueous hydrophobic silica dispersion was added at the high level (Sample G), appeared to impart a significant matting effect relative to the control coating. Good gloss reduction also was observed when aerogel and precipitated silica were added at the high level (Sample E). The data seem to point toward a possible trend for increased matting effects when a third agent (precipitated silica or wax) was added in the preparation of the coating composition.

Added matting agent appeared to result in some increases in haze values, with the largest increase in Sample G (III-high).

Slight increases in Konig hardness were observed with all experimental samples, with somewhat higher values observed in Samples D (II-low), E (II-high) and G (III-high).

Example 4

A base dispersion, CAB-O-SPERSE 1015A dispersion, is combined with ENOVA MT1100 aerogel and CAB-O-SIL TS-610 silica according to the procedure set out in Table 11 below.

TABLE 11

| | |
|---|---|
| CAB-O-SPERSE 1015A Base Dispersion | 400.00 |
| Premix at 1000-3000 rpm then add the following | |
| Water | 6.00 |
| Surfonamine B-200 dispersant | 6.00 |
| Add the following under mixing @ 1000 RPM | |
| Aerogel | 4 |
| Mix for 10 minutes at 3000 RPM, if the viscosity is satisfactory, then add | |
| Aerogel | 4 |
| Mix for 10 minutes at 3000 RPM, if the viscosity is satisfactory, then add | |
| Aerogel | 4 |
| Mix for 10 minutes at 3000 RPM, if the viscosity is satisfactory, then add | |
| Aerogel | 4 |
| Mix for 10 minutes at 3000 RPM, if the viscosity is satisfactory, then add | |
| Aerogel | 4 |
| Mix for 10 minutes at 3000 RPM, if the viscosity is satisfactory, then add | |
| BYK-024 defoamer | 0.4 |
| Mix for 5 minutes at 1000 RPM, if the viscosity is satisfactory, then add | |
| Aerogel | 4 |
| TS-610 fumed silica | 4 |
| Total | 440.40 |

The resulting aqueous hydrophobic silica dispersion is evaluated in a polyurethane-acrylic system (NeoPac® R-9699 brand polymers). The procedure for preparing uncured coating compositions with two different levels of silica loading and a control composition not having silica is provided in Table 12.

TABLE 12

|  | A Control | B I-low | C II-high |
|---|---|---|---|
| Resin[a] | 50.00 | 50.00 | 50.00 |
| Stir resin at setting 2 on speed controller. Preweigh the ingredients below, and then add to above: | | | |
| Butyl cellosolve | 4.00 | 4.00 | 4.00 |
| Dowanol DPM glycol ether | 2.00 | 2.00 | 2.00 |
| Dehyran 1293 defoamer | 0.30 | 0.30 | 0.30 |
| BYK 346 additive | 0.20 | 0.20 | 0.20 |
| Water | 2.30 | 2.30 | 2.30 |
| Total | | 58.80 | 58.80 |
| Add to the above under agitation (Setting 2). | | | |
| Dispersion | Control | I-low | I-high |
| Amount of silica dispersion added | 0.00 | 1.12 | 2.24 |
| Mix for 20 minutes at setting 2 then check for fineness of grind | | | |

[a]NeoPac ® R-9699 waterborne urethane-acrylic at a solid loading of 40%

The coating compositions are cast out on Leneta 2C charts using a 3 mil wet drawdown bar, then cured. For measurement of optical properties, the flash-off is conducted for 10 minutes at room temperature and the bake cycle for 30 minutes at 150° F. It is expected that the coatings prepared with aqueous hydrophobic silica dispersions would exhibit at least 15% lower gloss, measured at 60°, than the control composition prepared without silica.

Example 5

A base dispersion, CAB-O-SPERSE 1015A dispersion, is combined with ENOVA MT1100 aerogel and CAB-O-SIL TS-610 silica according to the procedure set out in Table 13 below.

TABLE 13

| CAB-O-SPERSE 1015A Base Dispersion | 400.00 |
|---|---|
| Premix at 1000-3000 rpm then add the following | |
| Water | 6.00 |
| Jeffamine ED-900 dispersant | 6.00 |
| Add the following under mixing @ 1000 RPM | |
| Aerogel | 4 |
| Mix for 10 minutes at 3000 RPM, if the viscosity is satisfactory, then add | |
| Aerogel | 4 |
| Mix for 10 minutes at 3000 RPM, if the viscosity is satisfactory, then add | |
| Aerogel | 4 |
| Mix for 10 minutes at 3000 RPM, if the viscosity is satisfactory, then add | |
| Aerogel | 4 |
| Mix for 10 minutes at 3000 RPM, if the viscosity is satisfactory, then add | |
| Aerogel | 4 |
| Mix for 10 minutes at 3000 RPM, if the viscosity is satisfactory, then add | |
| BYK-024 defoamer | 0.4 |

TABLE 13-continued

| Mix for 5 minutes at 1000 RPM, if the viscosity is satisfactory, then add | |
|---|---|
| Aerogel | 4 |
| TS-610 fumed silica | 4 |
| Total | 440.40 |

The resulting aqueous hydrophobic silica dispersion is added to a polyurethane resin system (NeoRez® R-960 waterborne urethane) to prepare coating dispersions B through D, as shown in the procedure presented in Table 14. Control Sample A is prepared in the absence of silica. Samples D is prepared by adding the silica dispersion directly to the resin, followed by the premixed solvent. Samples and C are prepared by adding the premixed solvent directly to the resin, followed by the aqueous hydrophobic silica dispersion.

TABLE 14

| Dispersion: | A | B | C | D |
|---|---|---|---|---|
| Resin[a] | 100.00 | 100.00 | 100.00 | 100.00 |
| Stir resin at setting 2 on speed controller. Preweigh the ingredients below, and then add to above: | | | | |
| Silica dispersion Amount | 0.00 | 0.00 | 0.00 | 16.20 |
| Premix the following add to the above under agitation (setting 2) | | | | |
| Water | 1.70 | 1.70 | 1.70 | 1.70 |
| BYK-346 additive | 0.20 | 0.20 | 0.20 | 0.20 |
| Dehydran 1293 defoamer | 0.30 | 0.30 | 0.30 | 0.30 |
| DPM glycol ether | 0.50 | 0.50 | 0.50 | 0.50 |
| Add to the above under agitation (setting 2) | | | | |
| Silica Dispersion Amount | 0.00 | 8.09 | 16.20 | 0.00 |
| Mix for 20 minutes at high speed (setting 2) then check for fineness of grind | | | | |

[a]NeoRez ® R-960 waterborne urethane

A control and three experimental coatings (films) are prepared by casting the coating formulations descried above on ACT Bonderite® 1000 brand CRS panel, available from ACT Test Panel Technologies, using the 3 mil wet drawdown bar described above. For samples for optical characterization, the flash-off step is 10 minutes at room temperature; the bake cycle is 150° F. for 30 minutes. It is expected that coatings prepared with aqueous hydrophobic silica dispersions exhibit lower gloss than coatings prepared without silica and that the order of addition of solvent and silica has little or no effect on the optical and hardness properties.

Example 6

Aqueous hydrophobic silica dispersions are prepared with CAB-O-SIL EL-90 hydrophilic fumed silica and TS-530 hexamethyldisilazane-treated hydrophobic fumed silica from Cabot Corporation according to the procedure in Table 15 below.

TABLE 15

| Process step | Dispersion 6A Amount (g) | Dispersion 6B Amount (g) |
|---|---|---|
| Water<br>Premix at 1000-3000 rpm, then add: | 28.2 | 32.0 |
| EL-90 silica<br>Add Under Mixing at 1000-3000 RPM: | 5 | 2 |
| Surfonamine B200 dispersant | 3.90 | 1.56 |
| Peregal-25 dispersant |  | 1.56 |
| Water | 52.7 | 52.7 |
| Add Under Mixing at 1000-3000 RPM |  |  |
| TS-530 silica<br>Mix for 10 minutes at 3,000 RPM<br>If Viscosity satisfactory, Add: | 5 | 5 |
| TS-530 silica | 5 | 5 |
| BYK024 defoamer<br>Mix for 20 more minutes at 3,000 RPM | 0.2 | 0.2 |

The resulting aqueous hydrophobic silica dispersions are added to an acrylic composition according to the procedure in Table 16 below. A control dispersion having no silica is also prepared.

TABLE 16

| | Control Dispersion | Dispersion 11A Amount (g) | Dispersion 11B Amount (g) |
|---|---|---|---|
| Neocryl E160 resin (34%)<br>Add under agitation, stirring at setting 2 on speed controller: | 100 | 100 | 100 |
| Water | 8.7 | 8.7 | 8.7 |
| BYK346 dispersant | 0.2 | 0.2 | 0.2 |
| Dehydran 1293 additive | 0.3 | 0.3 | 0.3 |
| Butyl carbitol | 4 | 4 | 4 |
| DPnB glycol ether | 4 | 4 | 4 |
| DPM glycol ether<br>Add under agitation, stirring at setting 2 on speed controller: | 2.2 | 2.2 | 2.2 |
| Aqueous Hydrophobic Silica Dispersion<br>Mix for 20 minutes stirring at high speed on speed controller | — | 8.9 | 11.0 |

The compositions are cast on Leneta 2C charts with a 3 mil drawdown bar using the previously described method and allowed to dry at ambient temperature for 10 minutes and 30 minutes at 150° F. It is expected that the coatings containing silica exhibit at least 15% lower gloss at 60° than the coating prepared without silica.

Example 7

The aerogel described in Table 1 can differ in optical properties. This example was conducted to evaluate possible differences between the translucent and opaque varieties of the aerogel in a polyurethane system.

The base dispersion, Cab-O-Sperse® 1015A dispersion, was used to prepare two aqueous hydrophobic silica dispersions, P, containing a translucent aerogel, ENOVA® MT1100 aerogel, and Q, containing an opaque aerogel, ENOVA® MT1200 aerogel). CAB-O-SIL® TS-610 silica was added to both dispersions. Details regarding the protocol followed in preparing Dispersions P and Q are presented in Table 17.)

TABLE 17

| | P (Translucent Aerogel) | Q (Opaque Aerogel) |
|---|---|---|
| Cab-O-Sperse ® 1015A Base Dispersion | 600.00 | 600.00 |
| Premix the ingredients below, then add to above at 1000 RPM | | |
| Water | 18.00 | 18.00 |
| Jeffamine M2070 dispersant | 18.00 | 18.00 |
| Add the following under mixing at 1000 RPM | | |
| Additive | 12 Translucent Aerogel | 12 Opaque Aerogel |
| Mix at 3000 RPM for 10 minutes or until the additive is fully incorporated, then add | | |
| Additive | 12 Translucent Aerogel | 12 Opaque Aerogel |
| Mix at 3000 RPM for 10 minutes or until the additive is fully incorporated, then add | | |
| Additive | 12 Translucent Aerogel | 12 Opaque Aerogel |
| Mix at 3000 RPM for 10 minutes or until the additive is fully incorporated, then add | | |
| Additive | 12 Translucent Aerogel | 12 Opaque Aerogel |
| Mix at 3000 RPM for 10 minutes or until the additive is fully incorporated, then add | | |
| Additive | 12 Translucent Aerogel | 12 Opaque Aerogel |
| Mix at 3000 RPM for 10 minutes or until the additive is fully incorporated, then add | | |
| BYK-024 defoamer | 0.6 | 0.4 |
| Mix at 1000 RPM for 5 minutes at 1000 RPM, then add | | |
| Additive | 12 Translucent Aerogel | 8.2 Opaque Aerogel |
| TS-610 silica | 6 | 2.65 |
| Total (g) | 714.60 | 707.45 |
| Mix for 20 minutes at 3000 RPM. | | |
| Silica Dispersions | P | Q |
| Total solids (%) | 26.78 | 26.13 |

Aqueous hydrophobic silica dispersions P and Q were added to a polyurethane resin system (NeoRez® R-960 polymers) to prepare coating formulations B through G, using the procedure presented in Table 18. Control Sample A was prepared in the absence of an added matting composition.

TABLE 18

| Formulation | A | B | C | D | E | F | G |
|---|---|---|---|---|---|---|---|
| Resin[a] | 100.00 | 100.00 | 100.00 | 100.00 | 100.00 | 100.00 | 100.00 |
| Stir resin at setting 2. Preweigh the ingredients below, and then add to above: | | | | | | | |
| Water | 1.70 | 1.70 | 1.70 | 1.70 | 1.70 | 1.70 | 1.70 |
| BYK-346 additive | 0.20 | 0.20 | 0.20 | 0.20 | 0.20 | 0.20 | 0.20 |

TABLE 18-continued

| Formulation | A | B | C | D | E | F | G |
|---|---|---|---|---|---|---|---|
| Dehydran 1293 defoamer | 0.30 | 0.30 | 0.30 | 0.30 | 0.30 | 0.30 | 0.30 |
| DPM glycol ether | 0.50 | 0.50 | 0.50 | 0.50 | 0.50 | 0.50 | 0.50 |
| | 102.70 | 102.70 | 102.70 | 102.70 | 102.70 | 102.70 | 102.70 |
| Add to the above white stirring, setting 2 on speed controller | | | | | | | |
| Silica dispersion | Control | P | P | P | Q | Q | Q |
| Amount | 0.00 | 6.36 | 12.73 | 25.46 | 6.54 | 13.09 | 26.18 |
| Solid matting component relative to solid resin (%) | 0 | 1.9 | 3.7 | 7.4 | 1.8 | 3.7 | 7.4 |
| Mix for 20 minutes at high speed (setting 2) | | | | | | | |
| Measure pH and viscosity | | | | | | | |
| pH | 8.59 | 8.44 | 8.56 | 8.07 | 8.29 | 8.48 | 8.51 |
| Viscosity @ 100 RPM | 146 | 192 | 360 | 509 | 184 | 208 | 252 |

[a] NeoRez® R-960 waterborne urethane

A more marked increase in viscosity was observed with the addition of Dispersion P, while Dispersion Q remained within a more acceptable viscosity range relative to the control.

Coatings formulations A through G, prepared as described above, were evaluated for gloss, haze, Konig and pencil hardness. The results are shown in Tables 19-21.

TABLE 19

| | A | B | C | D | E | F | G |
|---|---|---|---|---|---|---|---|
| Gloss, 20 | 45.7 | 13.2 | 9.0 | 5.3 | 12.1 | 5.6 | 3.0 |
| Gloss 60 | 95.9 | 44.0 | 30.3 | 17.2 | 44.6 | 21.7 | 9.3 |
| Haze | 687.0 | 464 | 394 | 293 | 429 | 291 | 195 |

TABLE 20

| Konig Hardness | A | B | C | D | E | F | G |
|---|---|---|---|---|---|---|---|
| 2 hours | 33.0 | 39.0 | 44.0 | 41.0 | 36.0 | 37.0 | 43.0 |
| 4 hours | 50.0 | 48.0 | 46.0 | 42.0 | 49.0 | 48.0 | 43.0 |
| 8 hours | 57.0 | 46.0 | 45.0 | 44.0 | 51.0 | 49.0 | 49.0 |
| 24 hours | 49.0 | 51.0 | 50.0 | 46.0 | 45.0 | 45.0 | 48.0 |

TABLE 21

| | A | B | C | D | E | F | G |
|---|---|---|---|---|---|---|---|
| Pencil Hardness | 6H | 7H | 7H | 7H | 6H | 6H | 6H |

Two comparative products, R (TS-100 silica) and S (S363 wax) were added to a polyurethane resin system (NeoRez® R-960 polymers) to prepare coating formulations H through M using the procedure presented in Table 22.

TABLE 22

| Formulation | H | I | J | K | L | M |
|---|---|---|---|---|---|---|
| Resin[a] | 100.00 | 100.00 | 100.00 | 100.00 | 100.00 | 100.00 |
| Stir resin at setting 2 on speed controller. Preweigh the ingredients below, and then add to above: | | | | | | |
| Water | 1.70 | 1.70 | 1.70 | 1.70 | 1.70 | 1.70 |
| BYK-346 additive | 0.20 | 0.20 | 0.20 | 0.20 | 0.20 | 0.20 |
| Dehydran 1293 defoamer | 0.30 | 0.30 | 0.30 | 0.30 | 0.30 | 0.30 |
| DPM glycol ether | 0.50 | 0.50 | 0.50 | 0.50 | 0.50 | 0.50 |
| | 102.70 | 102.70 | 102.70 | 118.90 | 102.70 | 102.70 |
| Add to the above under agitation at setting 2 | | | | | | |
| Amt. matting agent | R | R | R | S | S | S |
| Amount | 1.71 | 3.42 | 6.84 | 1.71 | 3.42 | 6.84 |
| Solid matting component (%) relative to solid resin | 5 | 10 | 20 | 5 | 10 | 20 |
| Mix for 20 minutes at high speed setting 4 for product R and setting 2 for product S | | | | | | |
| Measure pH | | | | | | |
| pH | 8.49 | 8.32 | 8.39 | 8.45 | 8.56 | 8.19 |

[a] NeoRez ™ R-960 waterborne urethane

A more marked increase in viscosity was observed with the addition of compound R than compound S.

Coating formulations H through M, prepared according to the procedure described above, were evaluated for gloss, haze, Konig and pencil hardness. The results are shown in Tables 23 through 25.

TABLE 23

|  | H | I | J | K | L | M |
|---|---|---|---|---|---|---|
| Gloss, 20 | 6.5 | 3.7 | 2.7 | 14.5 | 8.5 | 4.6 |
| Gloss 60 | 16.5 | 8.1 | 5.5 | 44.9 | 27.6 | 21.5 |
| Haze | 354 | 245 | 225 | 524 | 382 | 245 |

TABLE 24

| Konig Hardness | H | I | J | K | L | M |
|---|---|---|---|---|---|---|
| 2 hours | 46.0 | 42.0 | 47.0 | 50.0 | 49.0 | 37.0 |
| 4 hours | 45.0 | 46.0 | 46.0 | 49.0 | 50.0 | 40.0 |
| 8 hours | 50.0 | 50.0 | 52.0 | 50.0 | 50.0 | 50.0 |
| 24 hours | 50.0 | 46.0 | 49.0 | 50.0 | 51.0 | 49.0 |

TABLE 25

|  | H | I | J | K | L | M |
|---|---|---|---|---|---|---|
| Pencil Hardness | 7H | 7H | 7H | 6H | 6H | 6H |

E 1.8% Aqueous hydrophobic silica dispersion Q in resin formulation
F 3.7% Aqueous hydrophobic silica dispersion Q in resin formulation
G 7.4% Aqueous hydrophobic silica dispersion Q in resin formulation
H 5% Comparative matting agent R (TS-100 silica) in resin formulation
I 10% Comparative matting agent R in resin formulation
J 20% Comparative matting agent R in resin formulation
K 5% Comparative matting agent S (S363 micronized wax) in resin formulation
L 10% Comparative matting agent S in resin formulation
M 20% Comparative matting agent S in resin formulation The results indicate that comparative matting agent S and R affected haze but not the Konig or pencil hardness relative to the control. Gloss, however, was considerably reduced in all formulations relative to the control.

Example 8

The performance of aerogel also was studied in a clear waterborne acrylic system, available from DSM under the designation of Neocryl® A-6016 waterborne acrylic.

The aqueous hydrophobic silica dispersion used was the same as dispersion Q in Example 7; matting agent R (TS-100 silica) was used in the comparative formulations AE-AG. The formulations were prepared using the procedure described in Table 26.

TABLE 26

| Formulation | AA | AB | AC | AD | AE | AF | AG |
|---|---|---|---|---|---|---|---|
| Neocryl A-6016 waterborne acrylic | 100.00 | 100.00 | 100.00 | 100.00 | 100 | 100 | 100 |
| Premix the following add to the above under good agitation (setting 2) | | | | | | | |
| Water | 8.70 | 8.70 | 8.70 | 8.70 | 8.70 | 8.70 | 8.70 |
| BYK-346 additive | 0.20 | 0.20 | 0.20 | 0.20 | 0.20 | 0.20 | 0.20 |
| Dehydran 1293 defoamer | 0.30 | 0.30 | 0.30 | 0.30 | 0.30 | 0.30 | 0.30 |
| Dowanol PnB glycol ether | 9.00 | 9.00 | 9.00 | 9.00 | 9.00 | 9.00 | 9.00 |
| Dowanol DPnB glycol ether | 2.00 | 2.00 | 2.00 | 2.00 | 2.00 | 2.00 | 2.00 |
| Dowanol DPM glycol ether | 2.50 | 2.50 | 2.50 | 2.50 | 2.50 | 2.50 | 2.50 |
|  | 100 | 122.70 | 122.70 | 122.70 | 122.70 | 122.70 | 122.70 |
| Add to the above under good agitation (setting 2) | | | | | | | |
| matting agent | none | Q | Q | Q | R (powder) | R (powder) | R (powder) |
| silica dispersion/powder added | 0.00 | 8.61 | 17.22 | 34.44 | 0.830 | 1.66 | 3.32 |
| % active solid matting agent relative to the resin | 0.00 | 1.84% | 3.69% | 7.38% | 1.84% | 3.69% | 7.38% |
| Evaluation of incorporation of matting agent | — | easy | easy | easy | easy | medium | hard |

The data are presented in FIGS. 5 through 9. A description of the samples is shown below:

A Control
B 1.9% Aqueous hydrophobic silica dispersion P in resin formulation
C 3.7% Aqueous hydrophobic silica dispersion P in resin formulation
D 7.4% Aqueous hydrophobic silica dispersion P in resin formulation Table 26, above, shows that an aqueous hydrophobic silica dispersion based on opaque aerogel dispersion Q was easy to incorporate into the acrylic system at all levels (formulation AB, AC and AD), yet matting agent R used in the powder form became increasingly more difficult to incorporate into the coating dispersions (AE, AF and AG).

The formulations were coated using a 3 mil drawdown bar according to the previously described method on ACT Bonderite® 1000 brand CRS panels, available from ACT Test Panel Technologies, and allowed to dry at ambient temperature for 10 minutes and 30 minutes at 150° F. Table 27 shows that gloss levels were reduced by the incorporation of both aerogel based dispersions as well as the powder formed matting agent R. Pencil hardness was not affected by either matting agent.

TABLE 27

|  | AA | AB | AC | AD | AE | AF | AG |
|---|---|---|---|---|---|---|---|
| gloss (20°) | 36.1 | 13.3 | 8.6 | 7.3 | 13.9 | 7.3 | 4.1 |
| gloss (60°) | 82.8 | 49.6 | 35.8 | 33.4 | 49.0 | 30.2 | 15.7 |
| haze | 667 | 564 | 485 | 460 | 552 | 423 | 323 |
| pencil hardness | 3H | 3H | 3H | 3H | 3H | 3H | 3H |

In another experiment, after drawdown films were prepared as shown before, the films were left to dry at ambient temperature only and Konig hardness development was recorded over time. As also shown in FIG. 10, comparison formulations (AE, AF and AG), using matting agent R, displayed lower Konig hardness especially in the early stage, while opaque aerogel based matting agent in formulations AB, AC and AD were very comparable with the acrylic control (AA), indicating good compatibility between the aerogel matting particles with the acrylic system.

Table 28 shows the results of the films' water resistance. Compared to the control, all formulations displayed better water resistance: no blistering of the film after water contact for one hour and good recovery of film strength after it was allowed to dry for one hour at ambient conditions. In particular, coating dispersion AB did not show any softening against water after 24 hrs at room temperature.

TABLE 28

| Early water resistance | AA | AB | AC | AD | AE | AF | AG |
|---|---|---|---|---|---|---|---|
| 2 hrs |  |  |  |  |  |  |  |
| blistering (Y or N) | Y | N | N | N | N | N | N |
| softening (Y/N) | Y | Y | Y | Y | Y | Y | Y |
| recover (Y/N) | N | Y | Y | Y | Y | Y | Y |
| 4 hrs |  |  |  |  |  |  |  |
| blistering (Y or N) | Y | N | N | N | N | N | N |
| softening (Y/N) | Y | Y | Y | Y | Y | Y | Y |
| recover (Y/N) | N | Y | Y | Y | Y | Y | Y |
| 8 hrs |  |  |  |  |  |  |  |
| blistering (Y or N) | Y | N | N | N | N | N | N |
| softening (Y/N) | Y | slight | Y | Y | Y | Y | Y |
| recover (Y/N) | N | Y | Y | Y | Y | Y | Y |
| 24 hrs |  |  |  |  |  |  |  |
| blistering (Y or N) | Y | N | N | N | N | N | N |
| softening (Y/N) | Y | N | Y | Y | Y | Y | Y |
| recover (Y/N) | N | — | Y | Y | Y | Y | Y |

Example 9

An aqueous hydrophobic silica dispersion was prepared according to the procedure in Table 29 below using CAB-O-SPERSE 2017A dispersion and Enova IC3120 aerogel from Cabot Corporation.

TABLE 29

| Process step | Amount (g) |
|---|---|
| Base 2017A Dispersion | 200 |
| Premix at 1000-3000 rpm, then add: |  |
| Water | 6 |
| PETROLITE D-1038 dispersant | 15 |
| Add Under Mixing at 1000-3000 RPM: |  |
| Aerogel | 4 |
| Mix for 10 minutes at 3,000 RPM |  |
| If Viscosity satisfactory: |  |
| Add Aerogel | 4 |
| Mix for 10 minutes at 3,000 RPM |  |
| If Viscosity satisfactory: |  |
| Add Aerogel | 4 |
| Mix for 10 minutes at 3,000 RPM |  |
| If Viscosity satisfactory: |  |
| Add Aerogel | 4 |
| Mix for 10 minutes at 3,000 RPM |  |
| If Viscosity satisfactory: |  |
| Add Aerogel | 4 |
| Mix for 10 minutes at 3,000 RPM |  |
| If Viscosity satisfactory: |  |
| Add Aerogel | 4 |
| Mix for 5 minutes at 1,000 RPM |  |
| If Viscosity satisfactory: |  |
| Add Aerogel | 4 |
| Mix for 20 more minutes at 3,000 RPM |  |

The resulting aqueous hydrophobic silica dispersion was added to a polyester composition according to the procedure in Table 30 below:

TABLE 30

|  | Amount (g) |
|---|---|
| NeoRez ™ R-960 resin | 100 |
| Add under agitation, stirring at setting 2 on speed controller: |  |
| Water | 1.7 |
| BYK346 dispersant | 0.2 |
| Dehydran 1293 additive | 0.3 |
| DOWANOL DPM glycol ether | 0.5 |
| Add under agitation, stirring at setting 2 on speed controller: |  |
| Aqueous Hydrophobic Silica Dispersion | 13.6 |
| Mix for 20 minutes stirring at high speed on speed controller |  |

The resulting coating composition was evaluated for fineness of grind using the Hegman grindometer. If the grind was satisfactory then the composition was cast on Bonderite 1000 panels using the previously described method and allowed to dry at ambient temperature for 10 minutes and 30 minutes at 150° F. The resulting coating had a Konig hardness of 40.0 and gloss of 5.4 and 19.8 at 20° and 60°, respectively. While the coating was matte in appearance, not shiny, it was milky, not clear. The D1038 dispersant does not have a cationic group and may not facilitate proper dispersion of both the hydrophobic and hydrophilic particulate aerogel, especially as additional components are added to the coating composition.

Example 10

Aqueous hydrophobic silica dispersions were prepared with CAB-O-SPERSE 2017A silica dispersion and Enova IC3130 and IC3120 aerogel from Cabot Corporation according to the procedure in Table 31 below.

TABLE 31

| Process step | Dispersion with IC3130 aerogel Amount (g) | Dispersion with IC3120 aerogel Amount (g) |
|---|---|---|
| Base 2017A Dispersion | 200 | 200 |
| Premix at 1000-3000 rpm, then add: | | |
| Water | 6 | 6 |
| Jeffamine M600 dispersant | 6 | 15 |
| Add Under Mixing at 1000-3000 RPM: | | |
| Aerogel | 4 | 4 |
| Mix for 10 minutes at 3,000 RPM | | |
| If Viscosity satisfactory: | | |
| Add Aerogel | 4 | 4 |
| Mix for 10 minutes at 3,000 RPM | | |
| If Viscosity satisfactory: | | |
| Add Aerogel | 4 | 4 |
| Mix for 10 minutes at 3,000 RPM | | |
| If Viscosity satisfactory: | | |
| Add Aerogel | 4 | 4 |
| Mix for 10 minutes at 3,000 RPM | | |
| If Viscosity satisfactory: | | |
| Add Aerogel | 4 | 4 |
| Mix for 10 minutes at 1000 RPM | | |
| If Viscosity satisfactory: | | |
| Add Aerogel | 4 | 4 |
| Mix for 20 more minutes at 3,000 RPM | | |

The resulting aqueous hydrophobic silica dispersion was added to a polyurethane composition, as described in Table 32:

TABLE 32

| | IC3130 dispersion Amount (g) | IC3120 dispersion Amount (g) |
|---|---|---|
| NeoRez™ R-960 resin | 100 | 100 |
| Add under agitation, stirring at setting 2 on speed controller: | | |
| Water | 1.7 | 1.7 |
| BYK-346 dispersant | 0.2 | 0.2 |
| Dehydran 1293 additive | 0.3 | 0.3 |
| DOWANOL DPM glycol ether | 0.5 | 0.5 |
| Add under agitation, stirring at setting 2 on speed controller: | | |
| Aqueous Hydrophobic Silica Dispersion | 12.6 | 13.6 |
| Mix for 20 minutes stirring at high speed on speed controller | | |

The resulting coating compositions were evaluated for fineness of grind using the Hegman grindometer. If the grind was satisfactory, then the composition was cast on Bonderite 1000 panels using the previously described method and allowed to dry at ambient temperature for 10 minutes and 30 minutes at 150° F. The resulting coatings were clear, exhibited good matting and hardness properties and had the properties listed in Table 33 below.

TABLE 33

| Property | IC3130 aerogel coating | IC3120 aerogel coating |
|---|---|---|
| Gloss, 20 | 8.7 | 7.7 |
| Gloss, 60 | 25.2 | 24.1 |
| Konig hardness | 46.0 | 47.0 |
| Pencil hardness | 2H | 2H |

The aqueous hydrophobic silica dispersions were also added to a polyurethane polycarbonate composition according to the procedure set out in Table 34 below.

TABLE 34

| | IC3130 dispersion Amount (g) | IC3120 dispersion Amount (g) |
|---|---|---|
| Stahl® RU-92-605 resin (30%) | 80 | 80 |
| Add under agitation, stirring at setting 2 on speed controller: | | |
| Water | 2.6 | 2.6 |
| BYK-346 dispersant | 0.4 | 0.4 |
| Dehydran 1293 additive | 0.4 | 0.4 |
| DPM glycol ether | 1.8 | 1.8 |
| PnB glycol ether | 1 | 1 |
| Add under agitation, stirring at setting 2 on speed controller: | | |
| Aqueous Hydrophobic Silica Dispersion | 12.6 | 13.6 |
| Mix for 20 minutes stirring at high speed on speed controller | | |

The resulting coating compositions were evaluated for fineness of grind using the Hegman grindometer. If the grind was satisfactory, then the composition was cast on Bonderite 1000 panels using the previously described method and allowed to dry at ambient temperature for 10 minutes and 30 minutes at 150° F. The resulting coatings were clear, exhibited good matting and hardness properties, and had the properties listed in Table 35.

TABLE 35

| Property | IC3130 aerogel coating | IC3120 aerogel coating |
|---|---|---|
| Gloss, 85 | 56 | 59 |
| Gloss, 60 | 18 | 18 |

Example 11

Aqueous hydrophobic silica dispersions were prepared with CAB-O-SIL EL-90 hydrophilic fumed silica and TS-720 siloxane-treated hydrophobic fumed silica from Cabot Corporation according to the procedure in Table 36 below.

TABLE 36

| Process step | Dispersion 11A Amount (g) | Dispersion 11B Amount (g) |
|---|---|---|
| Water | 28.2 | 32.0 |
| Premix at 1000-3000 rpm, then add: | | |
| EL-90 silica | 5 | 2 |
| Add Under Mixing at 1000-3000 RPM: | | |
| Jeffamine M2070 dispersant | 3.90 | 1.56 |
| Peregal-25 dispersant | | 1.56 |
| Water | 52.7 | 52.7 |
| Add Under Mixing at 1000-3000 RPM | | |
| TS-720 silica | 5 | 5 |
| Mix for 10 minutes at 3,000 RPM | | |
| If Viscosity satisfactory, Add: | | |
| TS-720 silica | 5 | 5 |
| BYK024 defoamer | 0.2 | 0.2 |
| Mix for 20 more minutes at 3,000 RPM | | |

The resulting aqueous hydrophobic silica dispersions were added to an acrylic/polyurethane composition according to the procedure in Table 37 below. A control dispersion having no silica was also prepared.

TABLE 37

|  | Control Dispersion | Dispersion 11A Amount (g) | Dispersion 11B Amount (g) |
| --- | --- | --- | --- |
| Neocryl E160 resin (34%) | 100 | 100 | 100 |
| Add under agitation, stirring at setting 2 on speed controller: | | | |
| Water | 8.7 | 8.7 | 8.7 |
| BYK346 dispersant | 0.2 | 0.2 | 0.2 |
| Dehydran 1293 additive | 0.3 | 0.3 | 0.3 |
| Butyl carbitol | 4 | 4 | 4 |
| DPnB glycol ether | 4 | 4 | 4 |
| DPM glycol ether | 2.2 | 2.2 | 2.2 |
| Add under agitation, stirring at setting 2 on speed controller: | | | |
| Aqueous Hydrophobic Silica Dispersion | — | 8.9 | 11.0 |
| Mix for 20 minutes stirring at high speed on speed controller | | | |

The resulting coating compositions were evaluated for fineness of grind using the Hegman grindometer and exhibited fineness of 25, 50, and 45 microns (between 6 and 4 Hegman units), respectively. The compositions were cast on Leneta 2C charts with a 3 mil drawdown bar using the previously described method and allowed to dry at ambient temperature for 10 minutes and 30 minutes at 150° F. The resulting coatings had the properties listed in Table 38 below.

TABLE 38

| Property | Control | Dispersion 11A | Dispersion 11B |
| --- | --- | --- | --- |
| Gloss, 20 | 52.8 | 24.1 | 17.7 |
| Gloss, 60 | 92.9 | 62.4 | 55.6 |
| Gloss, 85 | 97.9 | 79.6 | 77.5 |

The resulting aqueous hydrophobic silica dispersions were added to an acrylic copolymer composition according to the procedure in Table 39. A control dispersion having no silica was also prepared.

TABLE 39

|  | Control Dispersion | Dispersion 11A Amount (g) | Dispersion 11B Amount (g) |
| --- | --- | --- | --- |
| Neocryl XK98 resin (44%) | 100 | 100 | 100 |
| Add under agitation, stirring at setting 2 on speed controller: | | | |
| Water | 8.7 | 8.7 | 8.7 |
| BYK346 dispersant | 0.2 | 0.2 | 0.2 |
| Dehydran 1293 additive | 0.3 | 0.3 | 0.3 |
| Butyl Cellosolve | 2 | 2 | 2 |
| DPnB glycol ether | 1.4 | 1.4 | 1.4 |
| DPM glycol ether | 1 | 1 | 1 |
| Add under agitation, stirring at setting 2 on speed controller: | | | |
| Aqueous Hydrophobic Silica Dispersion | — | 11.5 | 14.4 |
| Mix for 20 minutes stirring at high speed on speed controller | | | |

The resulting coating compositions were evaluated for fineness of grind using the Hegman grindometer. The grind was 10, 50 and 40 microns (50.8 microns is equivalent to a Hegman grind of 4) for the three dispersions, respectively. The compositions were cast on Leneta 2C charts with a 3 mil drawdown bar using the previously described method and allowed to dry at ambient temperature for 10 minutes and 30 minutes at 150° F. The resulting coatings had the properties listed in Table 40 below.

TABLE 40

| Property | Control | Dispersion 11A | Dispersion 11B |
| --- | --- | --- | --- |
| Gloss, 20 | 60.7 | 15.6 | 23.5 |
| Gloss, 60 | 86.2 | 55.7 | 64.7 |
| Gloss, 85 | 95.9 | 86.4 | 89.9 |

Example 12

A silica dispersion was prepared as according to the procedure in Table 41 using CAB-O-SPERSE PG022 dispersion. Three different dispersants, DisperBYK 190 (40%), DisperBYK 192 (100%), and Solsperse 46000 (50%) additives were employed.

TABLE 41

|  | DisperBYK 190 dispersant | DisperBYK 192 dispersant | Solsperse 46000 dispersant |
| --- | --- | --- | --- |
| Base PG 022 Dispersion | 185 | 200 | 190 |
| Premix at 1000-3000 rpm, then add: | | | |
| Water | 10 | 10 | 10 |
| Dispersant | 25 | 10 | 20 |

All three of the above dispersions gelled upon addition of the dispersant. A similar mixture of 100 g CAB-O-SPERSE 1015A dispersion and 3.8 g of DisperBYK 192 dispersant also gelled upon manual stirring. The lack of cationic groups on the dispersant compositions employed in this example may render the silica dispersion unstable.

Example 13

Aqueous hydrophobic silica dispersions were prepared with Enova LA1000 aerogel from Cabot Corporation according to the procedure in Table 42.

TABLE 42

|  | A | B |
| --- | --- | --- |
| CABOSPERSE 2017A dispersion | 400.00 | 800.00 |
| Premix under good mixing 1000 RPM then add the following | | |
| Water | 1060.00 | 790.00 |
| Jeffamine M2070 dispersant | 96.00 | 48.00 |
| Add the following under good mixing 1000 RPM, mix for 20 minutes | | |
| Aerogel | 60.00 | 60.00 |
| Add the following under good mixing 1000 RPM, mix for 20 minutes | | |
| Aerogel | 60.00 | 60.00 |
| Add the following under good mixing 1000 RPM, mix for 20 minutes | | |
| Aerogel | 60.00 | 60.00 |
| Add the following under good mixing 1000 RPM, mix for 20 minutes | | |
| Aerogel | 60.00 | 60.00 |
| Add the following under good mixing 1000 RPM, mix for 20 minutes | | |
| Aerogel | 0.00 | 60.00 |
| Mix for another 20 minutes under good agitation (1000 RPM) | | |

The resulting dispersions were suitable for formulation into a coating for a batting or textile.

Example 14

An aqueous base silica dispersion was produced in a heavy duty 3¾ horsepower commercial blender equipped with a model 3PN1010 Variac variable transformer using water, CAB-O-SIL L-90 fumed silica from Cabot Corporation, and potassium hydroxide according to the prescribed proportions in Table 43. Following mixing at setting 20 on the transformer, Jeffamine M2070 dispersant was added according to the prescribed proportion listed below. ENOVA IC3120 aerogel was then added in five equal aliquots, each followed by mixing at a setting of 30-50 on the transformer until the aerogel was incorporated. The dispersion was mixed for an additional 60 min at a setting of 30-50 on the transformer and then milled using an Eiger mill and 1 mm zirconium beads. The dispersion was suitable for use in a coating formulation to provide matte performance.

TABLE 43

| Component | % |
|---|---|
| Water | 67.74 |
| Fumed silica | 19.27 |
| KOH | 2.61 |
| Dispersant | 2.89 |
| Aerogel | 7.50 |

Example 15

An aqueous base silica dispersion was produced using water and CAB-O-SIL M-5 fumed silica from Cabot Corporation according to the prescribed proportions in Table 44 below. Following mixing at 1000 RPM, Jeffamine M2070 dispersant was added according to the prescribed proportion listed below, followed by ENOVA LA1000 aerogel, which was added in five equal aliquots. The dispersion was mixed for 20 min at 1000 RPM following the addition of each aliquot and then an additional 20 min. The dispersion was suitable for use in a formulation to coat or infiltrate a batting or textile.

TABLE 44

| Component | % |
|---|---|
| Water | 75.03 |
| Fumed silica | 7.02 |
| Dispersant | 2.48 |
| Aerogel | 15.48 |

While this invention has been particularly shown and described with references to preferred embodiments thereof, it will be understood by those skilled in the art that various changes in form and details may be made therein without departing from the scope of the invention encompassed by the appended claims.

What is claimed is:

1. An aqueous hydrophobic silica dispersion comprising:
   at least 5 wt % of a hydrophilic particulate silica selected from the group consisting of fumed silica, colloidal silica, and precipitated silica;
   hydrophobic silica comprising a particulate silica selected from the group consisting of fumed silica, colloidal silica, silica aerogel, and precipitated silica, the hydrophobic silica having a methanol number of at least 60; and
   a dispersant having at least one cationic or cationizable group and an HLB ratio of 2 to 20,
   wherein the total amount of particulate silica in the aqueous hydrophobic silica dispersion is at least 15% by weight.

2. The aqueous hydrophobic silica dispersion of claim 1, wherein the hydrophobic silica is present in the aqueous dispersion in a ratio of at least 1:10 with respect to water.

3. An aqueous coating composition comprising a mixture of:
   a polymer component; and
   the aqueous hydrophobic silica dispersion of claim 1,
   wherein the aqueous coating composition, when dried, has a gloss, measured at 60°, that is at least 15% lower than that of a dried control composition not containing particulate silica.

* * * * *